United States Patent
Hu

(10) Patent No.: US 10,951,470 B2
(45) Date of Patent: Mar. 16, 2021

(54) BLUETOOTH MESH NETWORK PROVISIONING

(71) Applicant: Alibaba Group Holding Limited, George Town (KY)

(72) Inventor: Junfeng Hu, Hangzhou (CN)

(73) Assignee: Alibaba Group Holding Limited

( * ) Notice: Subject to any disclaimer, the term of this patent is extended or adjusted under 35 U.S.C. 154(b) by 0 days.

(21) Appl. No.: 16/407,013

(22) Filed: May 8, 2019

(65) Prior Publication Data

US 2019/0349252 A1    Nov. 14, 2019

(30) Foreign Application Priority Data

May 14, 2018  (CN) .......................... 201810457233.2

(51) Int. Cl.
| | | |
|---|---|---|
| H04L 12/24 | (2006.01) | |
| H04W 48/16 | (2009.01) | |
| H04W 4/80 | (2018.01) | |
| H04W 84/18 | (2009.01) | |

(52) U.S. Cl.
CPC ......... *H04L 41/0806* (2013.01); *H04W 4/80* (2018.02); *H04W 48/16* (2013.01); *H04W 84/18* (2013.01)

(58) Field of Classification Search
CPC .......... H04L 41/0806; H04L 63/0876; H04W 48/16; H04W 4/80; H04W 4/50; H04W 84/18; H04W 12/00512; H04W 8/005; H04W 88/16
See application file for complete search history.

(56) References Cited

U.S. PATENT DOCUMENTS

| | | | |
|---|---|---|---|
| 8,035,479 B2 | 10/2011 | Tran | |
| 8,514,758 B2 | 8/2013 | De Kimpe | |
| 8,670,374 B2 | 3/2014 | Bata | |
| 9,025,461 B2 | 5/2015 | Krishnamurthy | |
| 9,276,818 B2 | 3/2016 | Turon | |
| 10,111,071 B2 | 10/2018 | Polo | |
| 2005/0271021 A1* | 12/2005 | Alemany | H04W 48/20 370/338 |

(Continued)

FOREIGN PATENT DOCUMENTS

| | | |
|---|---|---|
| CN | 107509160 | 12/2017 |
| TW | 270307 | 1/2007 |

(Continued)

OTHER PUBLICATIONS

Murillo et al., Bluetooth Now or Low Energy: Should BLE Mesh Become a Flooding or Connection Oriented Network? IEEE, Feb. 15, 2018.

*Primary Examiner* — Robert C Scheibel
(74) *Attorney, Agent, or Firm* — Van Pelt, Yi & James LLP

(57) ABSTRACT

Information reported by one or more gateway nodes in a Bluetooth mesh network regarding an unprovisioned Bluetooth device is received. Provisioning data for the unprovisioned Bluetooth device is generated. A destination Bluetooth gateway node to which to issue the generated provisioning data is determined from among the one or more gateway nodes reporting the received information. The generated provisioning data is issued to the destination Bluetooth gateway node so that the destination Bluetooth gateway node can perform a provisioning operation directed at the unprovisioned Bluetooth device.

18 Claims, 8 Drawing Sheets

(56) References Cited

U.S. PATENT DOCUMENTS

| | | | |
|---|---|---|---|
| 2006/0093998 A1 | 5/2006 | Vertegaal | |
| 2006/0171540 A1 | 8/2006 | Lee | |
| 2012/0300812 A1 | 11/2012 | Ly-Gagnon | |
| 2013/0145000 A1 | 6/2013 | Meyer | |
| 2015/0245204 A1 | 8/2015 | Heydon | |
| 2015/0245351 A1 | 8/2015 | Banerjea | |
| 2016/0241999 A1 | 8/2016 | Chin | |
| 2016/0286474 A1* | 9/2016 | Panwar | H04W 4/80 |
| 2017/0019752 A1 | 1/2017 | Hardt | |
| 2017/0150362 A1* | 5/2017 | Clemenson | H04W 4/029 |
| 2017/0201854 A1 | 7/2017 | Choi | |
| 2017/0272317 A1* | 9/2017 | Singla | H04L 67/02 |
| 2018/0132102 A1 | 5/2018 | Kwon | |
| 2018/0176851 A1* | 6/2018 | Lim | H04W 40/12 |
| 2019/0037470 A1* | 1/2019 | Yeh | H04W 40/08 |

FOREIGN PATENT DOCUMENTS

| | | |
|---|---|---|
| TW | 615047 | 2/2018 |
| WO | 2017051173 | 3/2017 |

* cited by examiner

BLUETOOTH MESH NETWORK PROVISIONING

CROSS REFERENCE TO OTHER APPLICATIONS

This application claims priority to People's Republic of China Patent Application No. 201810457233.2 entitled BLUETOOTH MESH NETWORK AND PROVISIONING METHOD, DEVICE AND STORAGE MEDIUM THEREOF filed May 14, 2018 which is incorporated herein by reference for all purposes.

FIELD OF THE INVENTION

The present application relates to the field of Bluetooth wireless technology. In particular, it relates to Bluetooth wireless networks.

BACKGROUND OF THE INVENTION

Bluetooth is a wireless technology standard used for transmitting and receiving data over relatively short distances. Example uses of Bluetooth wireless technology include communication between a mobile device (e.g., phone) and a handsfree headset, communication between a mobile device (e.g., phone) and a car stereo system, wireless networking when relatively little bandwidth is needed, communication between a computer and input and output devices (e.g., mouse, keyboard, printer, etc.), communication between a game console and a game controller, and other short-range communication among a plurality of devices. Bluetooth wireless technology typically uses short-wavelength radio waves (e.g., in the 2.4 gigahertz to 2.485 gigahertz range). Because radio waves are used, devices using Bluetooth wireless technology do not have to be in visual line of sight of one another in order to communicate.

BRIEF DESCRIPTION OF THE DRAWINGS

Various embodiments of the invention are disclosed in the following detailed description and the accompanying drawings.

DETAILED DESCRIPTION

Figure 1:
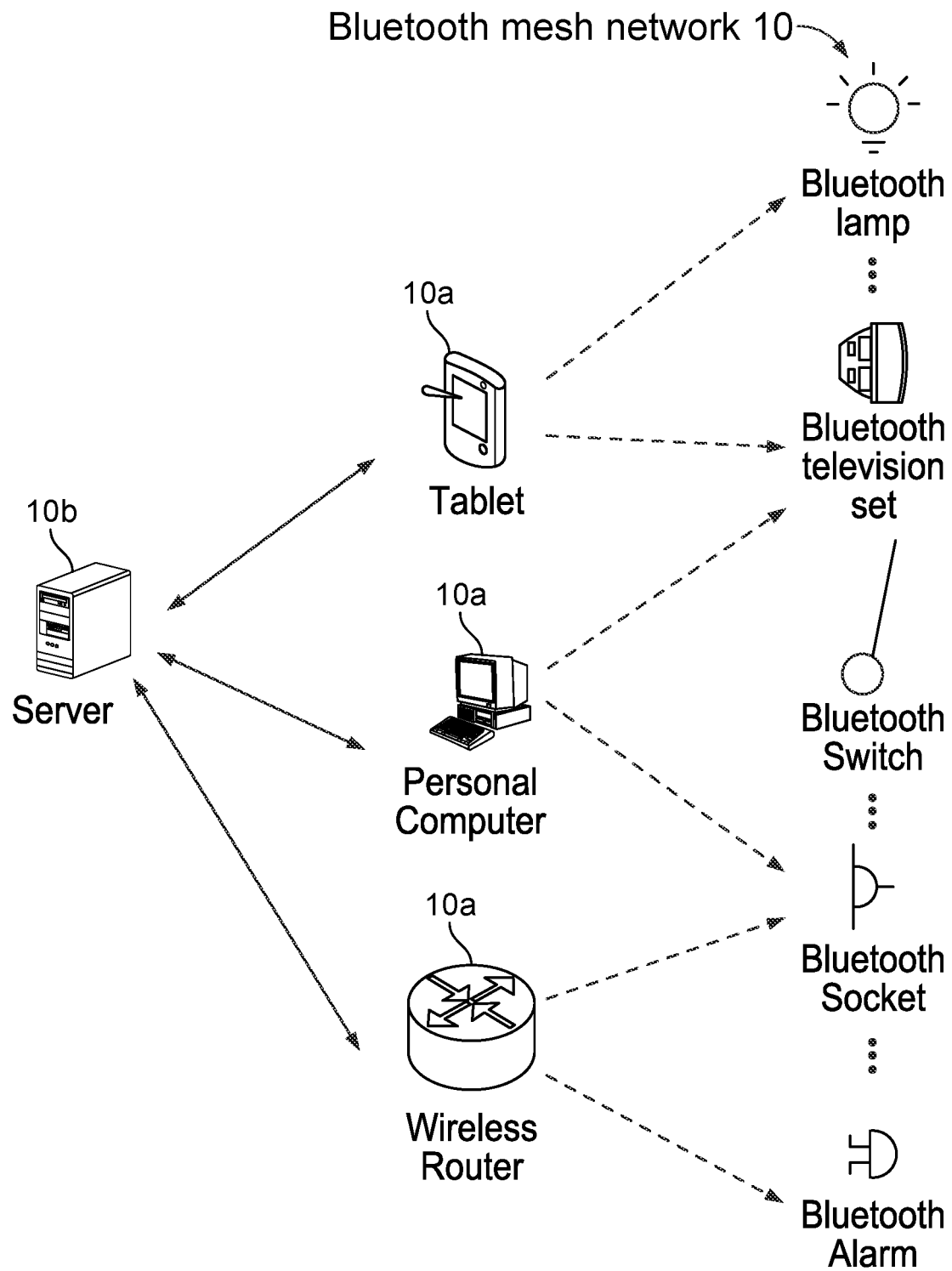
FIG. 1 is a diagram illustrating an embodiment of a Bluetooth mesh network in accordance with the invention.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A mesh network (e.g., a Bluetooth mesh network) is a type of wireless network in which each node may send and receive signals. Each node may communicate directly with one or more peer nodes. To overcome limits on the communication range of Bluetooth devices, the Bluetooth Special Interest Group published the Bluetooth Mesh Profile Specification, which specifies the Bluetooth Low Energy (BLE) standard. Bluetooth mesh networks include provisioners and Bluetooth devices. To ensure security of a Bluetooth mesh network, Bluetooth devices need to be added to the Bluetooth mesh network by being provisioned by a provisioner. During provisioning, Bluetooth devices need to be located within the signal coverage area of the provisioner in order to communicate with the provisioner. This limits the coverage of the Bluetooth mesh network. Thus, it would be beneficial to develop techniques to address the problem of Bluetooth mesh network coverage limitations. The present application discloses a Bluetooth mesh network architecture and provisioning method that addresses Bluetooth mesh network coverage limitations by allowing for a wider coverage area for provisioning. Provisioning coverage can be extended to a relatively large distance, and by deploying Bluetooth gateways in a quantity commensurate with the required coverage area, flexibility can be achieved.

In some embodiments, the Bluetooth mesh network architecture includes a plurality of Bluetooth gateways and a server communicatively connected to the plurality of Bluetooth gateways. In various embodiments, the server is responsible for generating provisioning data for unprovisioned Bluetooth devices detected by the plurality of Bluetooth gateways. In various embodiments, the plurality of Bluetooth gateways is responsible for performing provisioning operations for detected (unprovisioned) Bluetooth devices using the provisioning data generated by the server (so that the unprovisioned Bluetooth devices can access the Bluetooth mesh network). Stated alternatively, in various embodiments, Bluetooth gateways are Bluetooth mesh network nodes that are points of access to a Bluetooth mesh network for Bluetooth devices. In various embodiments, a server-Bluetooth gateway collaborative mode is employed. In various embodiments, the Bluetooth mesh network supports a plurality of Bluetooth gateways, which allows for a wider coverage area. Moreover, Bluetooth gateways can be deployed in a quantity commensurate with the required network coverage area, making it possible to flexibly expand Bluetooth mesh network provisioning coverage and thus overcome limitations on provisioning coverage.

In various embodiments, there is interaction between a Bluetooth gateway and a server in order to perform Bluetooth mesh network provisioning. In some embodiments, Bluetooth mesh network provisioning from the perspective of a Bluetooth gateway includes detecting an unprovisioned Bluetooth device within a signal coverage area, reporting information about the detected, unprovisioned Bluetooth device to a server in the Bluetooth mesh network so that the server can generate provisioning data for the detected, unprovisioned Bluetooth device, and performing a provisioning operation directed at the detected, unprovisioned Bluetooth device based at least in part on the provisioning data from the server.

From the perspective of the server, in various embodiments, Bluetooth mesh network provisioning includes receiving information about a destination Bluetooth device reported by one or more Bluetooth gateways (wherein the destination Bluetooth device is an unprovisioned Bluetooth device detected by the one or more Bluetooth gateways), determining a destination Bluetooth gateway from the one or more Bluetooth gateways and generating provisioning data for the destination Bluetooth device, and issuing the provisioning data to the destination Bluetooth gateway so that the destination Bluetooth gateway can perform a provisioning operation directed at the destination Bluetooth device.

In some embodiments, a Bluetooth gateway in a Bluetooth mesh network includes memory, a processor, and a communication component. In some embodiments, the memory stores computer programs and the processor executes the computer programs, e.g., for detecting an unprovisioned Bluetooth device within the signal coverage area of the Bluetooth gateway, reporting detected, unprovisioned Bluetooth device information through the communication component to a server in the Bluetooth mesh network so that the server can issue provisioning data for the detected, unprovisioned Bluetooth device, and, upon receiving the provisioning data issued by the server through the communication component, performing a provisioning operation directed at the detected, unprovisioned Bluetooth device based at least in part on the provisioning data. In some embodiments, a computer-readable medium stores the computer programs that implement the provisioning steps performed by the Bluetooth gateway.

In some embodiments, the server in the Bluetooth mesh network includes memory, a processor, and a communication component. In various embodiments, the communication component receives destination Bluetooth device information reported by one or more Bluetooth gateways in the Bluetooth mesh network (wherein the destination Bluetooth device is an unprovisioned Bluetooth device detected by the one or more Bluetooth gateways). In some embodiments, the memory stores computer programs, and the processor executes the computer programs, e.g., for determining a destination Bluetooth gateway from the one or more Bluetooth gateways, generating provisioning data for the destination Bluetooth device, and issuing the provisioning data via the communication component to the destination Bluetooth gateway so that the destination Bluetooth gateway can perform a provisioning operation directed at the destination Bluetooth device. In some embodiments, a computer-readable medium stores the computer programs that implement the provisioning steps performed by the server.

In order to further clarify the objectives, technical schemes, and advantages of the present invention, further details of the present invention are described below in light of specific embodiments and corresponding drawings of the present invention. The embodiments described are only some of the embodiments of the present invention and are not all the embodiments. The technical schemes associated with various embodiments are explained in detail below in conjunction with the drawings.

FIG. 1 is a diagram illustrating an embodiment of a Bluetooth mesh network in accordance with the invention. As shown in FIG. 1, Bluetooth mesh network 10 includes a plurality of Bluetooth gateways 10a and a server 10b. The plurality of Bluetooth gateways 10a and the server 10b are communicatively connected. The communicative connections may be wired or wireless.

In some embodiments, server 10b is deployed on a cloud and Bluetooth gateways 10a access the Internet (e.g., wide-area network or metropolitan-area network) via WiFi, Ethernet, fiber optics, or a 2G/3G/4G/5G or other mobile network. In some embodiments, Bluetooth gateways 10a establish communicative connections with server 10b via the Internet to achieve two-way communications with server 10b. The Bluetooth mesh network shown in FIG. 1 includes a plurality of Bluetooth gateways, which solves the problem of having a single point of failure. If a particular Bluetooth gateway fails, the other Bluetooth gateways can continue to operate, without paralyzing the entire Bluetooth mesh network. This makes for a more robust Bluetooth mesh network.

As shown in FIG. 1, the plurality of Bluetooth gateways 10a may be computer devices that support Bluetooth technology, have Bluetooth detection functions, and have processing capability. Example devices include a wireless router, a smart phone, a tablet, a personal computer, a Bluetooth probe, and other devices that support Bluetooth communication technology. The implementations of Bluetooth gateways 10a presented in FIG. 1 are merely examples and do not impose limits on other implementations.

In various embodiments, a Bluetooth gateway 10a generally includes at least one processing unit, at least one memory device, and a Bluetooth communication module. The numbers of processing units and memory devices may depend on the Bluetooth gateway configuration and type. Memory may be volatile, such as RAM, or non-volatile, such as read-only memory (ROM) or flash memory (or it may simultaneously include both types). The memory may store an operating system (OS) and one or more applications. It may also store program data. In addition to processing units, memory, and Bluetooth communication modules, Bluetooth gateways 10a may also include network card chips, I/O buses, and audiovisual components. In some embodiments, Bluetooth gateways 10*a* also include peripheral devices such as keyboards, mice, styluses, printers, displays, and electronic screens. These peripheral devices are well known in the art and need not be discussed in detail here. In some embodiments, one or more of the Bluetooth gateways are the programmed computer system of FIG. 6.

In the example shown in FIG. 1, a server 10*b* is included. Server 10*b* may be a conventional server, a cloud server, a cloud host, a virtual data center server, or any other type of server. In some embodiments, server 10*b* includes one or more processors, one or more hard drives, memory, and system buses. The architecture may be similar to that of a general-purpose computer. In some embodiments, server 10*b* is the programmed computer system of FIG. 6.

In the example shown in FIG. 1, server 10*b* collaborates with a plurality of Bluetooth gateways 10*a* and can implement the provisioning functions specified in the Bluetooth Mesh Profile Specification. Through a collaborative process, unprovisioned Bluetooth devices may be authorized to access Bluetooth mesh network 10. The provisioning specified in the Bluetooth Mesh Profile Specification is a configuration process whereby unprovisioned Bluetooth devices become member nodes in a Bluetooth mesh network. The provisioning includes the process of providing unprovisioned Bluetooth devices with the provisioning data needed to successfully access the Bluetooth mesh network. The example shown focuses on the provisioning process of providing unprovisioned Bluetooth devices with the provisioning data needed to successfully access the Bluetooth mesh network, but provisioning, in general, is not limited to just this process. In various embodiments, server 10*b* is responsible for generating provisioning data for unprovisioned Bluetooth devices detected by Bluetooth gateways 10*a*. In various embodiments, Bluetooth gateways 10*a* are responsible for detecting unprovisioned Bluetooth devices and for performing provisioning operations for detected, unprovisioned Bluetooth devices based at least in part on the provisioning data generated by server 10*b* (so that these unprovisioned Bluetooth devices can successfully access Bluetooth mesh network 10).

"Provisioning data" refers to data that an unprovisioned Bluetooth device needs to successfully access a Bluetooth mesh network. Examples of such data include NetKey, AppKey, and unicast address data. A NetKey ensures the security of network layer communications and is shared among all member nodes in the network. The possession of a given NetKey defines membership in a given Bluetooth mesh network. In various embodiments, bestowal of a network's NetKey on a Bluetooth device is one of the main results of a provisioning operation. "Member nodes" refer to Bluetooth devices that successfully access a Bluetooth mesh network. An "AppKey" is a Bluetooth mesh network application key, e.g., a key for communication between a Bluetooth gateway and a Bluetooth device accessing a Bluetooth mesh network in a specific application scenario (e.g., a door-locking application scenario). A "unicast address" is an address used when communicating with other nodes after an unprovisioned Bluetooth device successfully accesses a Bluetooth mesh network.

In various embodiments, Bluetooth gateways 10*a* perform provisioning operations for detected, unprovisioned Bluetooth devices using the provisioning data. In various embodiments, "provisioning operation" refers to provisioning functions specified in the Bluetooth Mesh Profile Specification. "Provisioning operation" may refer to, but is not limited to, the forwarding of provisioning data to a detected, unprovisioned Bluetooth device so that the Bluetooth device may access Bluetooth mesh network 10.

In the example shown in FIG. 1, Bluetooth devices may be any devices that support Bluetooth communication technology (e.g., including Bluetooth transceiver hardware and software implementing Bluetooth protocols) and that may access Bluetooth mesh network 10. Examples of Bluetooth devices include a Bluetooth lamp, a Bluetooth switch, a Bluetooth socket, a Bluetooth television set, Bluetooth earphones, a Bluetooth audio system, a Bluetooth keyboard, a Bluetooth bracelet, a Bluetooth alarm, a Bluetooth tracker, a Bluetooth thermometer, a Bluetooth heart rate monitor, a Bluetooth sensor, or any other Bluetooth device. With respect to the example shown, "unprovisioned Bluetooth devices" refer to Bluetooth devices that do not yet have access to Bluetooth mesh network 10. In some embodiments, after the aforesaid unprovisioned Bluetooth devices successfully access Bluetooth mesh network 10 through a provisioning process, they serve as nodes in Bluetooth mesh network 10. Stated alternatively, Bluetooth mesh network 10 may include Bluetooth devices that successfully access Bluetooth mesh network 10 through provisioning operations.

In the example shown in FIG. 1, a server-Bluetooth gateway collaborative mode is employed. In the example shown, the Bluetooth mesh provisioning process is achieved interactively through a plurality of Bluetooth gateways 10*a* and server 10*b*. The plurality of Bluetooth gateways 10*a* can detect unprovisioned Bluetooth devices. This mode can expand the detection range beyond that of single nodes and thus can expand the provisioning coverage of a Bluetooth mesh network. Moreover, Bluetooth gateways can also be deployed in a quantity commensurate with the required network coverage, making it possible to flexibly expand the Bluetooth mesh network's provisioning coverage. Thus, this mode can overcome limitations of existing mesh networks with respect to constraints on provisioning coverage.

For example, in some application scenarios requiring a Bluetooth mesh network, network coverage may need to be extensive, and the needs may be satisfied by setting up a plurality of Bluetooth gateways. For example, it may be necessary to deploy an extensive Bluetooth mesh network to achieve home automation in a very large residence. A plurality of Bluetooth gateways may be deployed in the residence in order for all Bluetooth appliances, such as Bluetooth lamps, Bluetooth switches, Bluetooth sockets, Bluetooth stereo systems, Bluetooth refrigerators, and Bluetooth drinking fountains, which are in different locations throughout the residence, to access the Bluetooth mesh network through provisioning operations. For example, Bluetooth gateways may be deployed in various locations including each of the following: a first-floor living room, a second-floor staircase, a third-floor staircase, etc. In this manner, it would be possible to detect Bluetooth devices on the first floor, second floor, third floor, and in other locations. This can solve the problem of a single provisioner being unable to detect some Bluetooth devices because they are farther away. In addition, there would be no need to move a single provisioner back and forth to detect Bluetooth devices in different locations (e.g., from the first to the second floor, then to the third floor, and back to the first floor, etc.). The provisioning process would be simpler, more flexible, and more efficient, which would help to improve user experience.

In addition, as mentioned above, including a plurality of Bluetooth gateways solves the problem of having a single point of failure. If a particular Bluetooth gateway fails, the other Bluetooth gateways can continue to operate, without paralyzing the entire Bluetooth mesh network. This makes for a more robust Bluetooth mesh network.

The example application scenario described above highlights the advantages of a Bluetooth mesh network in accordance with the invention and does not limit application scenarios of Bluetooth mesh networks in accordance with the invention. A Bluetooth mesh network in accordance with the invention may be applied to a wider coverage scenario or to a narrower coverage scenario.

In the example shown in FIG. 1, server 10b, by collaborating with a plurality of Bluetooth gateways 10a, may authorize unprovisioned Bluetooth devices to access Bluetooth mesh network 10. Server 10b and the plurality of Bluetooth gateways 10a may employ multiple forms of collaboration, which are described in the examples below.

For example, in some embodiments in which authorization has been granted by server 10b, a user may pre-save a list of unprovisioned Bluetooth devices on server 10b. Server 10b may thus determine whether it needs to perform provisioning operations for unprovisioned Bluetooth devices on this list of unprovisioned Bluetooth devices. It may actively generate provisioning data for the unprovisioned Bluetooth devices on this list. The plurality of Bluetooth gateways 10a may detect unprovisioned Bluetooth devices in their respective signal coverage areas and report information about the detected, unprovisioned Bluetooth devices to server 10b so it can determine the appropriate provisioning data based on the information and issue the provisioning data to the Bluetooth gateways 10a that detected those Bluetooth devices. Thus, upon receiving the provisioning data issued by server 10b, the Bluetooth gateways 10a may perform provisioning operations on the detected, unprovisioned Bluetooth devices according to the provisioning data. With this implementation, server 10b may actively generate provisioning data for unprovisioned Bluetooth devices.

As another example, in some embodiments, a plurality of Bluetooth gateways 10a in Bluetooth mesh network 10 can detect unprovisioned Bluetooth devices within their respective signal coverage areas and report information about detected, unprovisioned Bluetooth devices to server 10b so that the server 10b can generate and issue provisioning data for detected, unprovisioned Bluetooth devices. As for server 10b, it may receive unprovisioned Bluetooth device information detected and reported by each of the plurality of Bluetooth gateways 10a, generate provisioning data for each of the detected, unprovisioned Bluetooth devices, and issue provisioning data to the Bluetooth gateways that detected the unprovisioned Bluetooth devices so that the Bluetooth gateways that detected the unprovisioned Bluetooth devices can perform provisioning operations directed at the unprovisioned Bluetooth devices. With this implementation, server 10b, as requested by the Bluetooth gateways 10a, generates provisioning data for the unprovisioned Bluetooth devices that are detected.

In the two example implementations described above, information about unprovisioned Bluetooth devices detected and reported by Bluetooth gateways 10a can include identifying information about the Bluetooth devices, e.g., universally unique identifiers (UUIDs). In some embodiments, information about the Bluetooth devices also includes signal strength information about the Bluetooth devices detected by Bluetooth gateways 10a, e.g., received signal strength indicators (RSSIs). UUIDs may include product IDs, media access control (MAC) addresses, and other information. A product ID may identify the Bluetooth device type, capabilities, and other such information. Server 10b may use the information about unprovisioned Bluetooth devices detected and reported by Bluetooth gateways 10a as a basis to identify the detected, unprovisioned Bluetooth devices.

When unprovisioned Bluetooth devices are being prepared to access the Bluetooth mesh network, the Bluetooth gateways near the Bluetooth devices may be notified through broadcasting. If the unprovisioned Bluetooth devices support the PB-ADV bearer layer, they may externally broadcast a beacon signal. If the unprovisioned Bluetooth devices use the PB-GATT bearer layer, they may send connectable broadcast data packets. When Bluetooth gateways 10a receive the beacon signal or broadcast data packet, they may confirm detection of the Bluetooth devices that sent the beacon signal or broadcast data packets, determine that these Bluetooth devices are prepared, and start the provisioning process for the Bluetooth devices.

A user may issue a detection instruction to Bluetooth gateways 10a. Bluetooth gateways 10a may detect unprovisioned Bluetooth devices within their signal coverage areas in response to user-issued detection instructions. A user may issue a detection instruction individually to each of the Bluetooth gateways 10a in Bluetooth mesh network 10 so as to instruct all the Bluetooth gateways 10a to detect unprovisioned Bluetooth devices within their signal coverage areas. For example, after Bluetooth mesh network 10 has been deployed and activated, it may be necessary for each of the Bluetooth gateways 10a to individually detect unprovisioned Bluetooth devices within their signal coverage areas. At this point, the user may individually issue a detection instruction to each of the Bluetooth gateways 10a in Bluetooth mesh network 10.

A user may also issue a detection instruction individually to some of the Bluetooth gateways in Bluetooth mesh network 10 so as to instruct these Bluetooth gateways to detect unprovisioned Bluetooth devices within their signal coverage areas. For example, a user may add a new Bluetooth lamp at a certain location in a home environment, but the Bluetooth devices in other locations would remain where they are. In such a situation, the user may issue a detection instruction to just the Bluetooth gateway closest to the newly added Bluetooth lamp, triggering that Bluetooth gateway with respect to just the unprovisioned Bluetooth devices within its signal coverage area and thus conserving Bluetooth gateway resources.

In the example of FIG. 1, a Bluetooth gateway may have a touchscreen, in which case a user may issue a detection instruction to the Bluetooth gateway through touch input and/or writing by hand. A Bluetooth gateway may support speech input, in which case a user may use speech to issue a detection instruction to the Bluetooth gateway. For example, the user may say: "Please begin detection."

In addition to being triggered by a user, a Bluetooth gateway may automatically detect unprovisioned Bluetooth devices within its coverage area according to a preconfigured detection scheme. For example, the Bluetooth gateway may periodically detect unprovisioned Bluetooth devices within its signal coverage area. The Bluetooth gateway may start detection of unprovisioned Bluetooth devices within its signal coverage area at a set detection time. The Bluetooth gateway may start detection of unprovisioned Bluetooth devices within its signal coverage area upon detection of a specified trigger event. The trigger event may be a power-on event, an activation event, a user event, or some other event.

Each Bluetooth gateway in Bluetooth mesh network 10 may detect one unprovisioned Bluetooth device or multiple unprovisioned Bluetooth devices within its signal coverage area, or it may detect no Bluetooth devices at all. In addition, the Bluetooth gateways may detect unprovisioned Bluetooth devices within their respective signal coverage areas simultaneously, or they may detect unprovisioned Bluetooth devices within their respective signal coverage areas at different times. Regardless of whether the Bluetooth gateways detect unprovisioned Bluetooth devices within their respective signal coverage areas at the same time or at different times, the information about the unprovisioned Bluetooth devices that each Bluetooth gateway detects may be reported to server 10b at different times. Server 10b may receive information about detected, unprovisioned Bluetooth devices as reported successively by each Bluetooth gateway.

Because application scenarios vary, the signal coverage areas of Bluetooth gateways may not overlap in some Bluetooth mesh networks but may overlap in other Bluetooth mesh networks. When there is overlapping of signal coverage areas of Bluetooth gateways, the unprovisioned Bluetooth devices within the overlapped zones may be detected by two or more Bluetooth gateways. Thus, information about a single unprovisioned Bluetooth device may be reported by two or more Bluetooth gateways to server 10b. Server 10b accordingly may receive information at different times about the same unprovisioned Bluetooth device from two or more Bluetooth gateways.

Seeing as a single unprovisioned Bluetooth device may be detected by two or more Bluetooth gateways, server 10b, in some embodiments, while in the process of issuing provisioning data for each detected, unprovisioned Bluetooth device, will first determine the one or more Bluetooth gateways that detected the unprovisioned Bluetooth device and then determine a destination Bluetooth gateway from among the one or more Bluetooth gateways that detected the unprovisioned Bluetooth device and then issue provisioning data relating to the unprovisioned Bluetooth device to the destination Bluetooth gateway, after which the destination Bluetooth gateway would perform a provisioning operation directed at the unprovisioned Bluetooth device. The destination Bluetooth gateway is a Bluetooth gateway that detected the unprovisioned Bluetooth device. The other Bluetooth gateways would not receive provisioning data for the unprovisioned Bluetooth device. In this manner, it is possible to avoid provisioning conflicts resulting from each of multiple Bluetooth gateways performing a provisioning operation on the same unprovisioned Bluetooth device.

Server 10b may directly issue the provisioning data to the destination Bluetooth gateway. As discussed previously, after the destination Bluetooth gateway receives the provisioning data, it may determine that there is a need to perform a provisioning operation on the detected, unprovisioned Bluetooth device using the provisioning data. A different approach may be that server 10b issues a provisioning instruction that includes the provisioning data for the destination Bluetooth gateway. With such an approach, after the destination Bluetooth gateway receives the provisioning instruction, it may learn of the need to perform a provisioning operation directed at the detected, unprovisioned Bluetooth device and then analyze the provisioning instruction and extract the provisioning data to perform a provisioning operation directed at the detected, unprovisioned Bluetooth device using the provisioning data.

Because server 10b may receive information about a single unprovisioned Bluetooth device reported by two or more Bluetooth gateways, server 10b may collect statistical information about Bluetooth gateways that report information on the Bluetooth device within a certain period of time so as to determine the one or more Bluetooth gateways that detected the same unprovisioned Bluetooth device.

Server 10b may, for each detected, unprovisioned Bluetooth device, employ a timer upon receiving information about that unprovisioned Bluetooth device as reported from a first Bluetooth gateway. This timer would be responsible for timing a specified length of time. In various embodiments, server 10b then waits to receive information about that unprovisioned Bluetooth device from another Bluetooth gateway during the timer's timing period. If information about the unprovisioned Bluetooth device reported by another Bluetooth gateway is received while the timer is running, the first Bluetooth gateway and the other Bluetooth gateway both would be deemed to be the aforementioned "one or more Bluetooth gateways that detected the unprovisioned Bluetooth device." Server 10b may confirm either the first Bluetooth gateway or the other Bluetooth gateway as the destination Bluetooth gateway. If information about the unprovisioned Bluetooth device reported by the other Bluetooth gateway is not received while the timer is running, only the first Bluetooth gateway would be deemed to be the aforementioned "one or more Bluetooth gateways that detected the unprovisioned Bluetooth device." Server 10b would then confirm the first Bluetooth gateway as the destination Bluetooth gateway (the first Bluetooth gateway being the Bluetooth gateway that first reported the unprovisioned Bluetooth device information).

The length of time timed by the timer may be adaptively set according to factors such as the application scenario and user experience. If the length of time is too long, provisioning efficiency and user experience can suffer. If the length of time is too short, it might not be enough time to determine other gateways that detect the same unprovisioned Bluetooth device. An example length of time timed by the timer is 1 second. Other lengths of time are also possible.

Server 10b may determine the destination Bluetooth gateway using one of the following approaches:

Approach 1: Server 10b may use the signal strengths (e.g., RSSIs) from an unprovisioned Bluetooth device detected by multiple Bluetooth gateways as a basis to select the destination Bluetooth gateway. This may happen when detected signal strengths reach a signal strength threshold. With this approach, the unprovisioned Bluetooth device information reported to server 10b by each Bluetooth gateway would need to include the signal strengths, e.g., RSSIs, from the unprovisioned Bluetooth device detected by the Bluetooth gateways. Therefore, when multiple Bluetooth gateways detect the same unprovisioned Bluetooth device, the destination Bluetooth gateway may be selected on the basis of the RSSI detected by each Bluetooth gateway. For example, the Bluetooth gateway with the strongest RSSI may be selected as the destination Bluetooth gateway. As another example, the Bluetooth gateway with an RSSI within a specified RSSI range may be selected as the destination Bluetooth gateway. As another example, the Bluetooth gateway with an RSSI above a specified RSSI threshold value may be selected as the destination Bluetooth gateway. With this approach, the selection of the destination Bluetooth gateway on the basis of the signal strengths of detected, unprovisioned Bluetooth devices favors the selection of a Bluetooth gateway receiving stronger signal strength, which in turn helps to improve communication quality during a provisioning operation and improve the probability that the provisioning operation will be successful.

Approach 2: Server 10b may use priority levels of multiple Bluetooth gateways as a basis to select the destination Bluetooth gateway. This may happen when priority levels reach a priority level threshold to serve as the destination Bluetooth gateway. With this approach, a priority level is assigned to each Bluetooth gateway in advance. For example, there may be a master gateway, a level 1 slave gateway, a level 2 slave gateway, and so forth. Therefore, when multiple Bluetooth gateways detect the same unprovisioned Bluetooth device, server 10b may give priority to selection of a higher-priority level Bluetooth gateway as the destination Bluetooth gateway.

In addition, rather than selecting the destination Bluetooth gateway just on the basis of signal strengths associated with an unprovisioned Bluetooth device detected by multiple Bluetooth gateways or just on the basis of priority levels of Bluetooth gateways, it is also possible to select the destination Bluetooth gateway by combining the two measures (e.g., according to both signal strengths and priority levels with a weighting assigned to each measure).

In some embodiments, server 10b receives information at different times about the same unprovisioned Bluetooth device from two or more Bluetooth gateways. For each detected, unprovisioned Bluetooth device, server 10b may, upon receiving information about that unprovisioned Bluetooth device as reported by a first Bluetooth gateway, directly confirm the first Bluetooth gateway as the destination Bluetooth gateway and issue provisioning data for the unprovisioned Bluetooth device to the destination Bluetooth gateway (wherein the first Bluetooth gateway is the Bluetooth gateway that first reported information about the unprovisioned Bluetooth device). Such an approach may involve promptly issuing the provisioning data to the Bluetooth gateway that detected the unprovisioned Bluetooth device, which can help the Bluetooth gateway promptly perform a provisioning operation directed at the unprovisioned Bluetooth device and help to improve provisioning efficiency. Alternatively, upon identifying the first Bluetooth gateway, server 10b may use unprovisioned Bluetooth device information reported by other Bluetooth gateways to continue identifying other Bluetooth gateways that detect the same unprovisioned Bluetooth device.

In various embodiments, if the destination Bluetooth gateway succeeds at provisioning, the other Bluetooth gateways are ignored. If the destination Bluetooth gateway fails at provisioning, a new destination Bluetooth gateway may be subsequently selected from the other Bluetooth gateways. When a new destination Bluetooth gateway is selected from the other Bluetooth gateways, the selection may be made according to the order in which information is reported by the other Bluetooth gateways, according to the signal strengths detected by the other Bluetooth gateways, according to the priority levels of the other Bluetooth gateways, or according to another approach (e.g., a hybrid of the approaches listed above).

The Bluetooth mesh network shown in FIG. 1 may be broadly applied to multiple application scenarios. Several application scenarios in which the Bluetooth mesh network shown in FIG. 1 may be deployed are presented as examples below:

For example, in a building automation scenario, multiple Bluetooth gateways 10a may be deployed as needed in a building. For example, on each floor of the building, one Bluetooth gateway that is primarily responsible for detecting unprovisioned Bluetooth devices on that floor may be deployed. A server may be deployed on the cloud. By having a plurality of Bluetooth gateways 10a collaborating with server 10b, it is possible to have all kinds of Bluetooth devices, such as Bluetooth lamps, Bluetooth switches, Bluetooth sockets, Bluetooth air-conditioning, Bluetooth door security, Bluetooth alarms, and Bluetooth cameras, access the Bluetooth mesh network and thereby allow for automated control of illumination, heating/cooling, security, and other building functions. After accessing the Bluetooth mesh network, Bluetooth devices (e.g., Bluetooth lamps, Bluetooth switches, Bluetooth air-conditioning, and Bluetooth alarms) in the building—whether they number in the dozens, hundreds, more than a thousand, etc.—can reliably and securely communicate and transmit information amongst themselves.

As another example, to raise efficiency and ensure production safety in many industrial fields, it is generally necessary to collect a large amount of information. For example, in rubber making it is necessary to collect internal mixer-related information such as temperature, pressure, and operating status. Coal mining requires the collection of information such as gas concentration and ventilation conditions. In these industrial contexts, Bluetooth sensors may be positioned so as to collect the required information. Bluetooth alarms, Bluetooth cameras, and other Bluetooth monitoring devices may be placed in appropriate locations. To better manage these Bluetooth sensors, Bluetooth alarms, Bluetooth cameras, and other Bluetooth devices, multiple Bluetooth gateways 10a may be deployed as needed, and server 10b may be deployed on the cloud. By having multiple Bluetooth gateways 10a collaborating with server 10b, it is possible for Bluetooth devices, such as Bluetooth sensors, Bluetooth alarms, and Bluetooth cameras, throughout the industrial setting to access a Bluetooth mesh network and thereby achieve automated control of information collection, monitoring, and other functions. In contrast to many wireless sensor networks, Bluetooth mesh networks can meet strict reliability, extensibility, and safety industrial requirements and perform better in terms of cost and efficiency.

The current invention includes various methods, processes, etc. associated with FIG. 1. Bluetooth mesh network provisioning is further described below (both from the perspective of Bluetooth gateways and from the perspective of a server).

Figure 2:
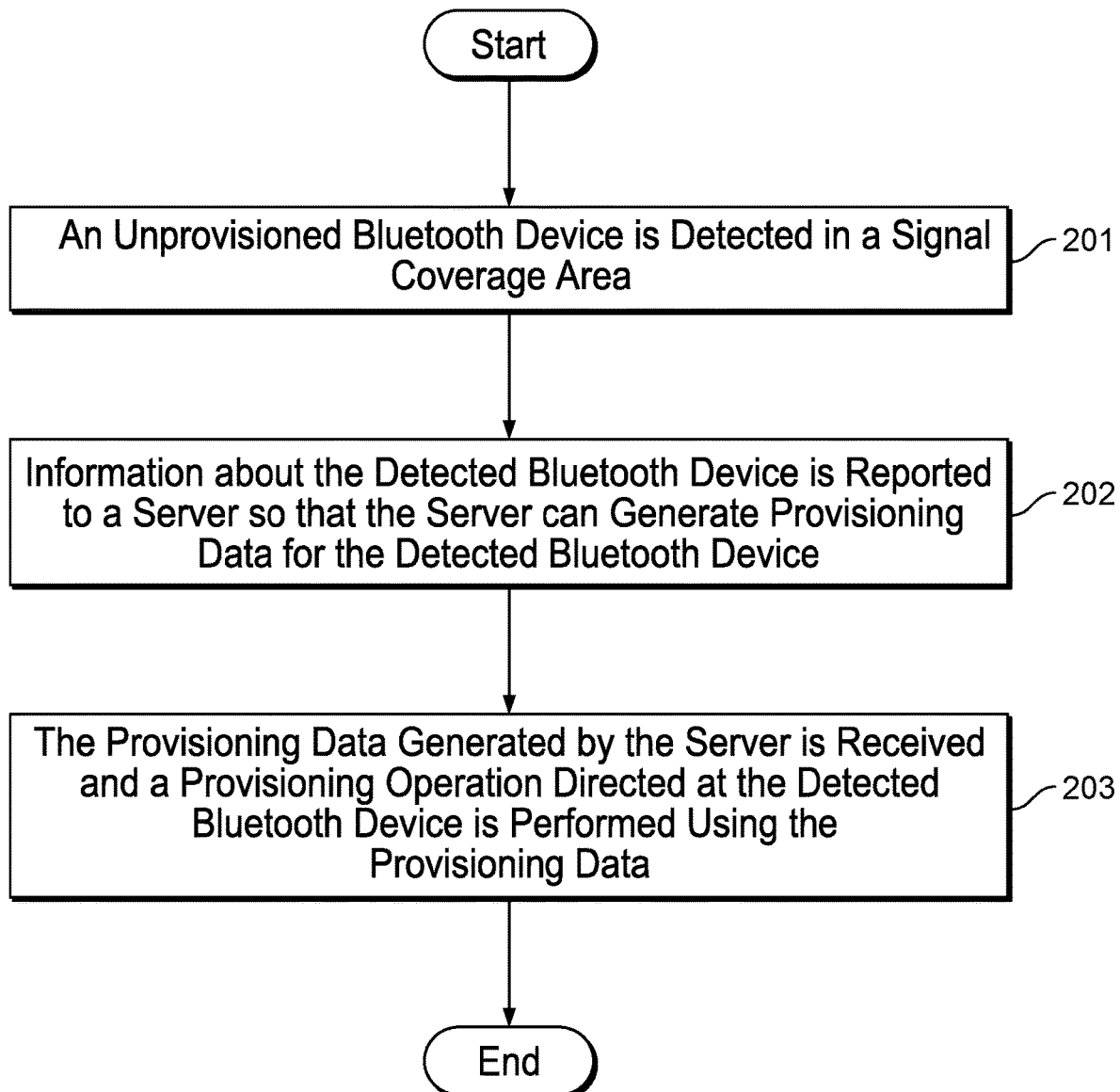
FIG. 2 is a flow chart illustrating an embodiment of a process for provisioning a Bluetooth device in a Bluetooth mesh network from the perspective of a Bluetooth gateway.

FIG. 2 is a flow chart illustrating an embodiment of a process for provisioning a Bluetooth device in a Bluetooth mesh network from the perspective of a Bluetooth gateway. In some embodiments, this process is performed by one of Bluetooth gateways 10a of Bluetooth mesh network 10 of FIG. 1. Because, in various embodiments, the operating principles of each Bluetooth gateway in a Bluetooth mesh network are the same or similar, one Bluetooth gateway will be used as an example.

At 201, an unprovisioned Bluetooth device is detected in a signal coverage area. In some embodiments, a Bluetooth gateway within Bluetooth mesh network 10 of FIG. 1 detects the unprovisioned Bluetooth device. In various embodiments, Bluetooth gateways are primarily responsible for detecting unprovisioned Bluetooth devices within their signal coverage areas (e.g., areas where they can reliably detect Bluetooth signals).

In some embodiments, unprovisioned Bluetooth devices notify nearby Bluetooth gateways through broadcasting when prepared to access the network. If the unprovisioned Bluetooth devices support the PB-ADV bearer layer, they may externally broadcast a beacon signal. If the unprovisioned Bluetooth devices use the PB-GATT bearer layer, they may send connectable broadcast data packets. Thus, when the Bluetooth gateways receive the beacon signal or broadcast data packets, they may confirm detection of Bluetooth devices that sent the beacon signal or broadcast data packets, determine that these Bluetooth devices are prepared, and start the provisioning process for them.

In some embodiments, a user issues a detection instruction to the Bluetooth gateways. The Bluetooth gateways may detect unprovisioned Bluetooth devices within their signal coverage areas in response to user-issued detection instructions.

In some embodiments, a Bluetooth gateway automatically detects unprovisioned Bluetooth devices within its coverage area according to a preconfigured detection scheme. For example, the Bluetooth gateway may periodically detect unprovisioned Bluetooth devices within its signal coverage area. Alternatively, the Bluetooth gateway may start detection of unprovisioned Bluetooth devices within its signal coverage area at a specified detection time. The Bluetooth gateway may also start detection of unprovisioned Bluetooth devices within its signal coverage area upon detection of a specified trigger event. The trigger event may be a power-on event, an activation event, a user event, or some other event. Additional description of detection is given above with respect to FIG. 1.

At 202, information about the detected Bluetooth device is reported to a server so that the server can generate provisioning data for the detected Bluetooth device. In some embodiments, the server receives the information about the detected Bluetooth device at step 301 of FIG. 3a. In some embodiments, the generation of provisioning data by the server is performed at step 302 of FIG. 3a.

In some embodiments, the Bluetooth gateways collaborate with the server in the Bluetooth mesh network in authorizing unprovisioned Bluetooth devices to access the Bluetooth mesh network. In various embodiments, when a Bluetooth gateway detects an unprovisioned Bluetooth device, it reports detected, unprovisioned Bluetooth device information to the server so that the server can generate and issue provisioning data for the detected, unprovisioned Bluetooth device. After the server generates provisioning data for the detected, unprovisioned Bluetooth device, the server may issue the provisioning data to a Bluetooth gateway that detected the unprovisioned Bluetooth device.

Because there may be multiple Bluetooth gateways that detect the unprovisioned Bluetooth device, the server may select from among multiple Bluetooth gateways to determine a destination Bluetooth gateway responsible for a provisioning operation for the unprovisioned Bluetooth device. Therefore, after a Bluetooth gateway reports information about the unprovisioned Bluetooth device that it detected to the server, it may or may not receive provisioning data issued by the server. Upon receiving the provisioning data issued by the server, the Bluetooth gateway may perform a provisioning operation directed at the detected, unprovisioned Bluetooth device using the received provisioning data.

At 203, the provisioning data generated by the server is received and a provisioning operation directed at the detected Bluetooth device is performed using the provisioning data. In some embodiments, the received provisioning data is the provisioning data issued at step 303 of FIG. 3a.

In some embodiments, a Bluetooth gateway may receive provisioning data directly issued by the server. In some embodiments, the Bluetooth gateway may receive a provisioning instruction issued by the server and analyze the provisioning instruction to extract provisioning data.

The executing entity for each step above may be the same device, or different devices may serve as the executing entity. For example, the executing entity of steps 201 through 203 may be device A. Or, in another example, the executing entity of steps 201 and 202 may be device A, and the executing entity of step 203 may be device B. In addition, multiple operations which appear to follow a specific sequence may be executed according to a sequence other than the one that appears in the text or may be executed in parallel. For example, operation sequence numbers such as 201 and 202 merely serve to differentiate the different operations from each other. The sequence numbers themselves do not represent any sequence of execution. In addition, these processes may include more or fewer operations, and these operations may be executed sequentially or in parallel. The descriptors "first," "second," and so on are for differentiating different messages, devices, modules, and so forth and do not represent a sequence, nor do "first" and "second" limit them to different types. The above is also applicable to FIG. 3a.

Figure 3A:
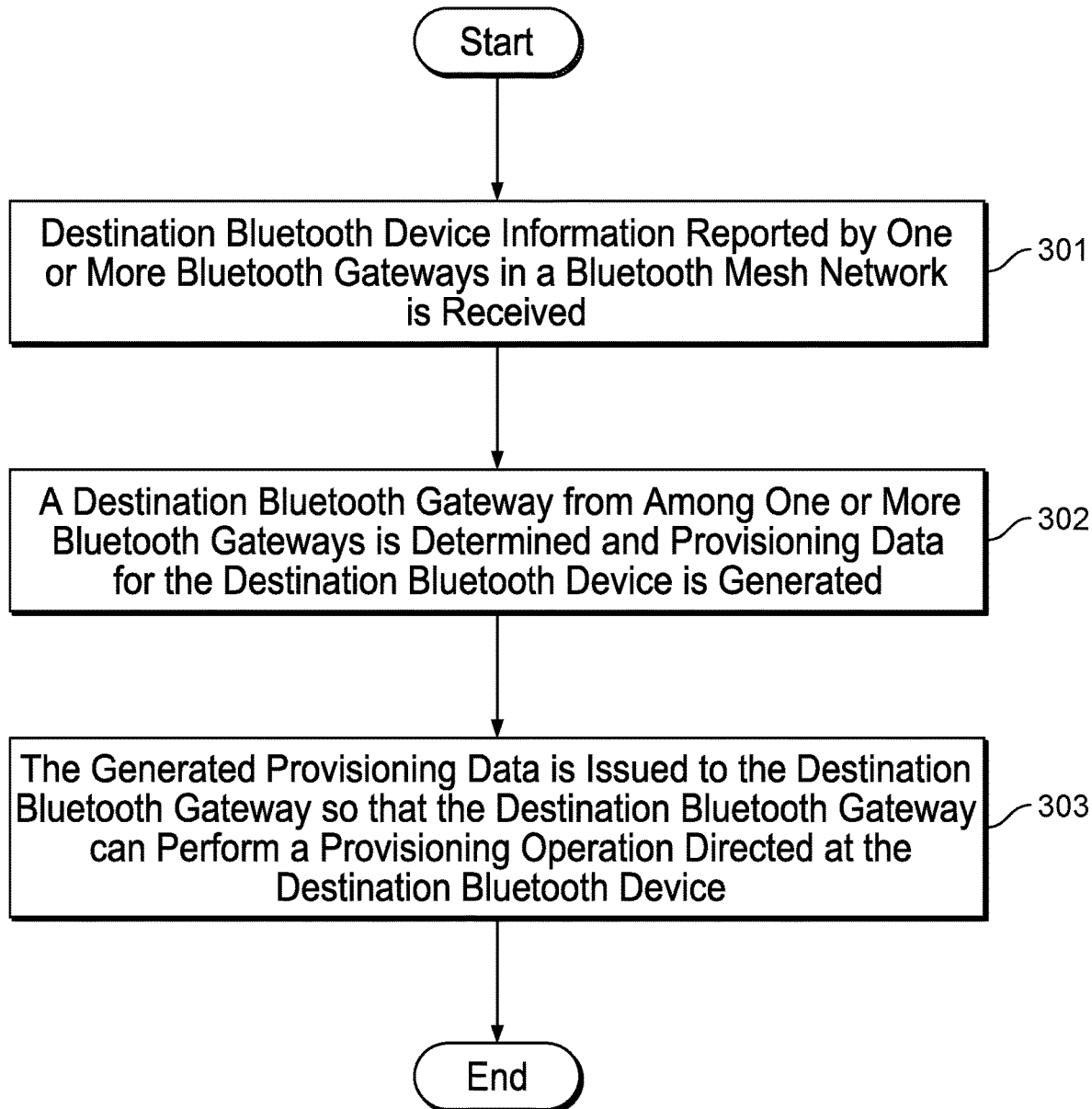
FIG. 3a is a flow chart illustrating an embodiment of a process for provisioning a Bluetooth device in a Bluetooth mesh network from the perspective of a server.

FIG. 3a is a flow chart illustrating an embodiment of a process for provisioning a Bluetooth device in a Bluetooth mesh network from the perspective of a server. In some embodiments, this process is performed by server 10b of Bluetooth mesh network 10 of FIG. 1. In various embodiments, the server is primarily responsible for generating and issuing provisioning data for unprovisioned Bluetooth devices detected by Bluetooth gateways. In various embodiments, the process whereby the server generates and issues provisioning data is the same or similar for each unprovisioned Bluetooth device that is detected (e.g., detected at step 201 of FIG. 2). Therefore, one detected, unprovisioned Bluetooth device will serve as an explanatory example here. The one detected, unprovisioned Bluetooth device is referred to as a destination Bluetooth device for the sake of descriptive convenience.

At 301, destination Bluetooth device information reported by one or more Bluetooth gateways in a Bluetooth mesh network is received. In various embodiments, the destination Bluetooth device is an unprovisioned Bluetooth device detected by one or more Bluetooth gateways. In some embodiments, the destination Bluetooth device information is reported by one or more Bluetooth gateways of Bluetooth gateways 10a of Bluetooth mesh network 10 of FIG. 1. In some embodiments, the destination Bluetooth device information is reported by one or more Bluetooth gateways at step 202 of FIG. 2.

In various embodiments, the Bluetooth mesh network includes a plurality of Bluetooth gateways, and the signal coverage areas of the plurality of Bluetooth gateways may or may not overlap. Therefore, the server may receive information about a destination Bluetooth device reported by multiple Bluetooth gateways, and the server would need to determine the destination Bluetooth gateway from among multiple Bluetooth gateways that detected the destination Bluetooth device. By determining one destination Bluetooth gateway, provisioning conflicts resulting from multiple Bluetooth gateways performing provisioning operations directed at one destination Bluetooth device can be avoided.

In some embodiments, upon receiving destination Bluetooth device information reported by a first Bluetooth gateway, a timer is started and while the timer is running, destination Bluetooth device information reported by other Bluetooth gateways will still be received (wherein the first Bluetooth gateway is the Bluetooth gateway that was the first to report the destination Bluetooth device information). The length of time timed by the timer may be adaptively set according to factors such as the application scenario and user experience. If the length of time is too long, provisioning efficiency and user experience may suffer. If the length of time is too short, there might not be enough time to determine other gateways that detect the same unprovisioned Bluetooth device. An example length of time timed by the timer is 1 second. Other lengths of time are also possible.

At 302, a destination Bluetooth gateway from among one or more Bluetooth gateways is determined and provisioning data for the destination Bluetooth device is generated. Determining the destination Bluetooth gateway and generating provisioning data may be performed in parallel (or sequentially in any order).

In some embodiments, if a timer is started due to Bluetooth device information being reported by a first Bluetooth gateway and destination Bluetooth device information reported by one or more other Bluetooth gateways is received while the timer is running, the destination Bluetooth gateway is determined from among the first Bluetooth gateway and the one or more other Bluetooth gateways. If no information about the destination Bluetooth device reported by another Bluetooth gateway is received while the timer is running, then the first Bluetooth gateway would be the destination Bluetooth gateway.

In some embodiments, determining the destination Bluetooth gateway from among a first Bluetooth gateway and other Bluetooth gateways includes using the signal strengths of the destination Bluetooth device detected by the first Bluetooth gateway and the other Bluetooth gateways as a basis to select the destination Bluetooth gateway (for Bluetooth gateways that can detect sufficiently strong signals from the destination Bluetooth device to serve as the destination Bluetooth gateway). In some embodiments, determining the destination Bluetooth gateway from among a first Bluetooth gateway and other Bluetooth gateways includes using priority levels of the first Bluetooth gateway and the other Bluetooth gateways as a basis to select the destination Bluetooth gateway (for Bluetooth gateways whose priority level meets a priority level requirement to serve as the destination Bluetooth gateway).

At 303, the generated provisioning data is issued to the destination Bluetooth gateway so that the destination Bluetooth gateway can perform a provisioning operation directed at the destination Bluetooth device. In some embodiments, the destination Bluetooth gateway receives the generated provisioning data and performs the provisioning operation directed at the destination Bluetooth device at step 203 of FIG. 2.

In some embodiments, upon receiving destination Bluetooth device information reported by a first Bluetooth gateway, subsequently received unprovisioned Bluetooth device information is used as a basis to identify other Bluetooth gateways that detected the destination Bluetooth device. It is possible, upon receiving destination Bluetooth device information reported by the first Bluetooth gateway, to directly regard the first Bluetooth gateway as the destination Bluetooth gateway. In various embodiments, when the first Bluetooth gateway is directly regarded as the destination Bluetooth gateway, subsequent identification of other Bluetooth gateways that detect the destination Bluetooth device will not affect the issuance of provisioning data. In this case, there would be no need to start the timer described above with respect to steps 301 and 302. The server may also sequentially identify all Bluetooth gateways that detect the destination Bluetooth device.

Figure 3B:
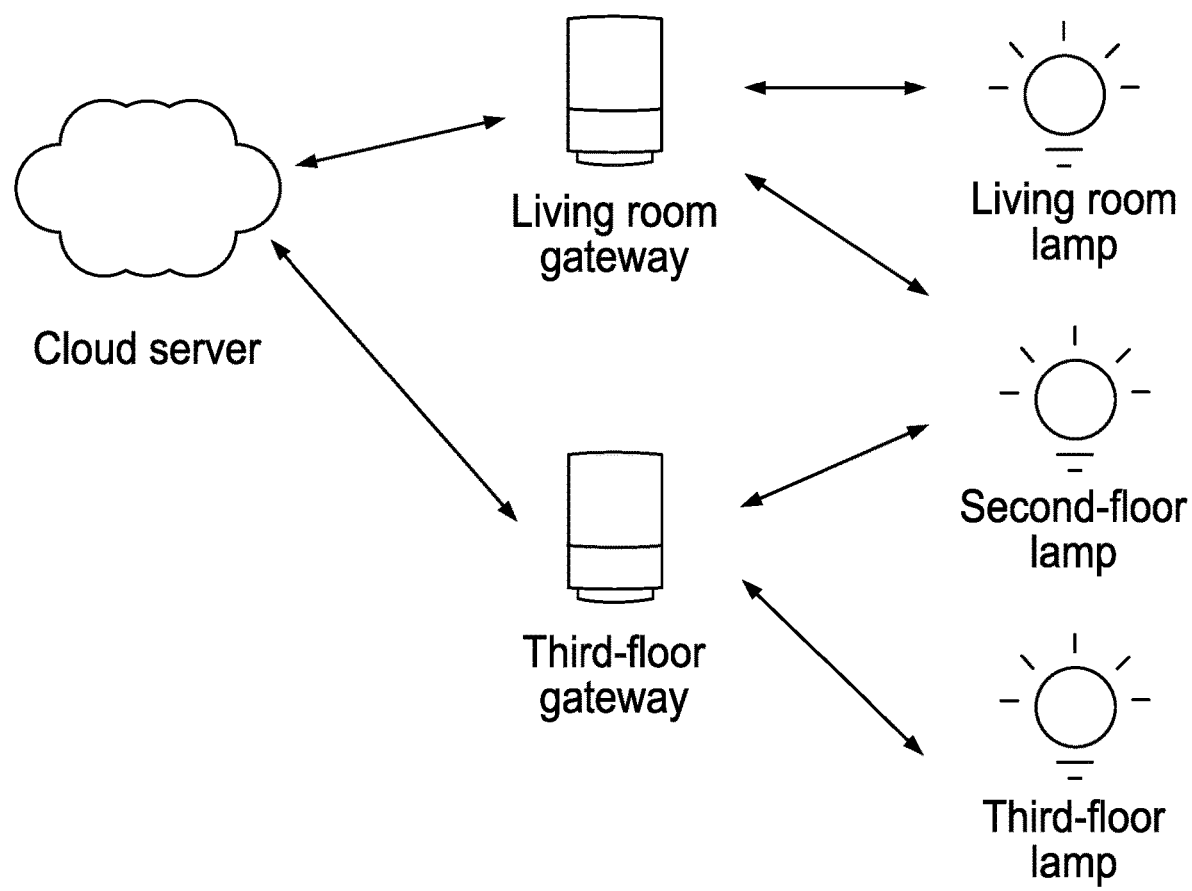
FIG. 3b is a diagram illustrating another example Bluetooth mesh network.

FIG. 3b is a diagram illustrating another example Bluetooth mesh network. As shown in FIG. 3b, the Bluetooth mesh network of FIG. 3b is deployed in a three-story home. The home's living room is on floor 1. A living room Bluetooth gateway (primary gateway) and a living room lamp are located in the living room. A second-floor lamp is located on floor 2, and a third-floor Bluetooth gateway (secondary gateway) and a third-floor lamp are located on floor 3. The living room Bluetooth gateway and the third-floor Bluetooth gateway are referred to as simply the living room gateway and the third-floor gateway, respectively, below and with respect to FIG. 3c. The second-floor lamp is close to both the living room gateway and the third-floor gateway. The living room gateway is able to simultaneously detect the living room lamp and the second-floor lamp. The third-floor gateway is able to simultaneously detect the third-floor lamp and the second-floor lamp. The provisioning processes for the living room lamp, the third-floor lamp, and the second-floor lamp are described in a multi-gateway context with reference to the diagram shown in FIG. 3c.

Figure 3C:
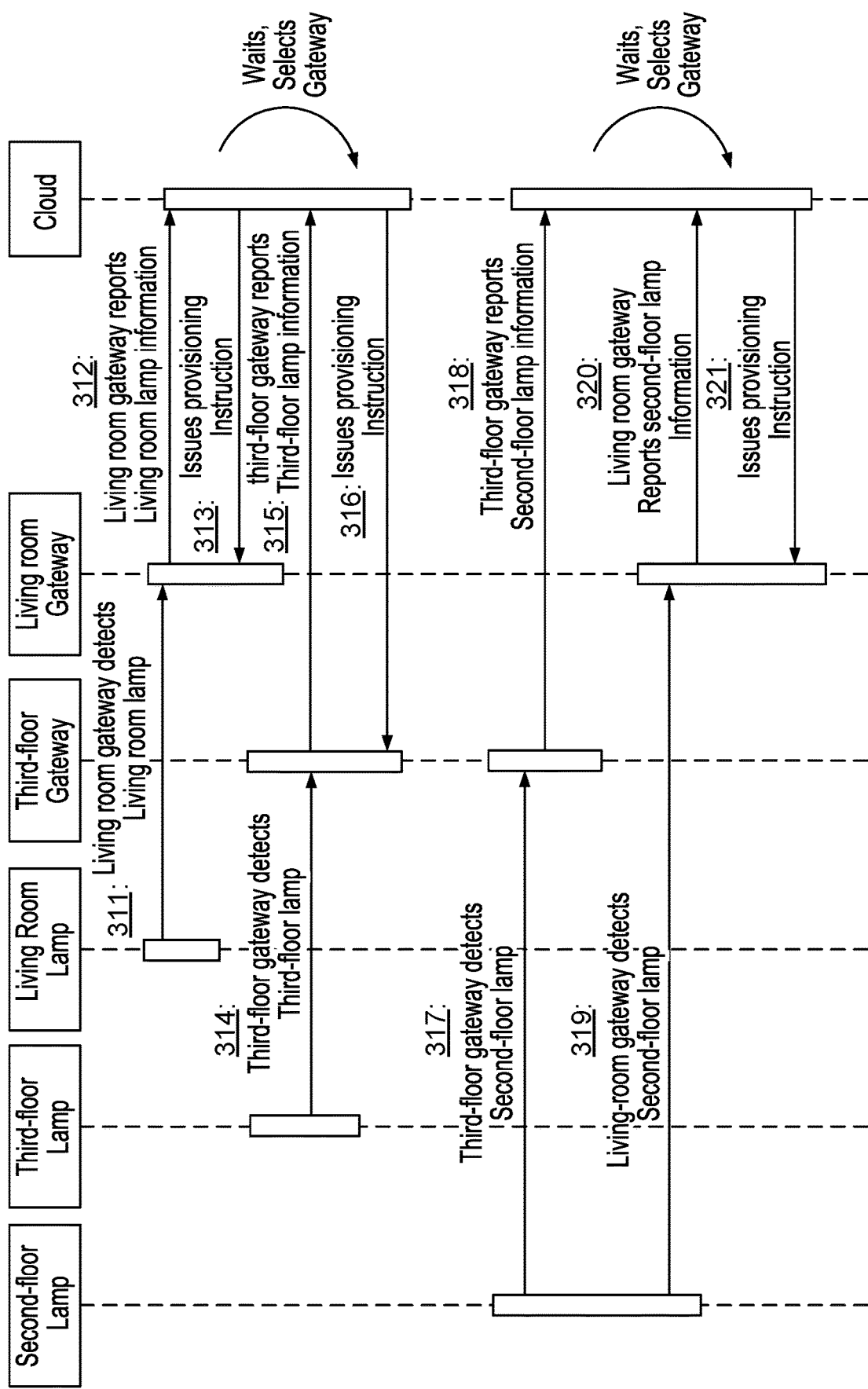
FIG. 3c is a diagram illustrating an example provisioning sequence for the Bluetooth devices in the Bluetooth mesh network shown in FIG. 3b.

FIG. 3c is a diagram illustrating an example provisioning sequence for the Bluetooth devices in the Bluetooth mesh network shown in FIG. 3b. In FIG. 3c, steps 311 through 313 describe provisioning for the living room lamp, steps 314 through 316 describe provisioning for the third-floor lamp, and steps 317 through 321 describe provisioning for the second-floor lamp. The sequence shown in FIG. 3c is merely an example. Other sequences for provisioning the three lamps are also possible. Steps 311-321 shown in FIG. 3c are described below.

311: The living room gateway receives a broadcast data packet sent by the living room lamp and determines that it has detected the living room lamp. The broadcast data packet carries the living room lamp UUID and other information.

312: The living room gateway reports living room lamp information to the cloud server (abbreviated as "Cloud" in FIG. 3c). The living room lamp information includes the UUID and RSSI of the living room lamp, but is not limited to these.

313: After receiving living room lamp information reported by the living room gateway, the cloud server waits for a specified length of time, e.g., 1 second. Because the living room lamp is relatively distant from the third-floor gateway and is outside the Bluetooth signal coverage area of the third-floor gateway, the cloud server does not receive living room lamp information reported by the third-floor gateway during the waiting period. Therefore, after the waiting period ends, the cloud server issues a provisioning instruction to the living room gateway to instruct the living room gateway to perform a provisioning operation directed at the living room lamp. The provisioning instruction carries provisioning data generated by the cloud server for the living room lamp.

314: The third-floor gateway receives a broadcast data packet sent by the third-floor lamp and determines that it has detected the third-floor lamp. The broadcast data packet carries the third-floor lamp UUID and other information.

315: The third-floor gateway reports third-floor lamp information to the cloud server. The third-floor lamp information includes the UUID and RSSI of the third-floor lamp, but is not limited to these.

316: After receiving the third-floor lamp information reported by the third-floor gateway, the cloud server waits for a specified length of time, e.g., 1 second. Because the third-floor lamp is relatively distant from the living room gateway and is outside the Bluetooth signal coverage area of the living room gateway, the cloud server does not receive third-floor lamp information reported by the living room gateway during the waiting period. Therefore, after the waiting period ends, the cloud server issues a provisioning instruction to the third-floor gateway to instruct the third-floor gateway to perform a provisioning operation directed at the third-floor lamp. The provisioning instruction carries provisioning data generated by the cloud server for the third-floor lamp.

317: The third-floor gateway receives a broadcast data packet sent by the second-floor lamp and determines that it has detected the second-floor lamp. The broadcast data packet carries the second-floor lamp UUID and other information.

318: The third-floor gateway reports the second-floor lamp information to the cloud server. The second-floor lamp information includes the UUID and RSSI of the second-floor lamp, but is not limited to these.

319: The living room gateway receives a broadcast data packet sent by the second-floor lamp and determines that it has detected the second-floor lamp. The broadcast data packet carries the second-floor lamp UUID and other information.

320: The living room gateway reports the second-floor lamp information to the cloud server. The second-floor lamp information includes the UUID and RSSI of the second-floor lamp, but is not limited to these.

321: Suppose that the cloud server first receives the second-floor lamp information reported by the third-floor gateway and then waits for a specified length of time, e.g., 1 second, following receipt of the information. If the cloud server receives the second-floor lamp information reported by the living room gateway within the waiting period, the cloud server may select the reporting gateway with the greater RSSI to be responsible for performing a provisioning operation directed at the second-floor lamp and issue the second-floor lamp provisioning data to the selected gateway. If the cloud server fails to receive second-floor lamp information reported by the living room gateway within the waiting period, the cloud server would select the third-floor gateway to be responsible for performing the provisioning operation directed at the second-floor lamp. FIG. 3c depicts the example of a provisioning instruction being issued to the living room gateway.

It is also possible that the cloud server could first receive the second-floor lamp information reported by the living room gateway and then receive the second-floor lamp information reported by the third-floor gateway. The processing flow would be similar to that described in step 321. In addition, the basis for selecting the gateway in step 321 may, in addition to RSSI, also include gateway priority level. For example, priority may be given to selecting the primary gateway.

In various embodiments, a Bluetooth mesh network provisioning process implemented through interactions between a plurality of Bluetooth gateways and a cloud server improves the user's experience and can flexibly expand the coverage area for Bluetooth mesh network provisioning. This helps to improve Bluetooth mesh network stability. Relative timing, RSSI, gateway priority level, and/or other factors may serve as bases for gateway selection from among a plurality of gateways and thus solve problems such as competing multiple gateways and provisioning conflicts.

Figure 4A:
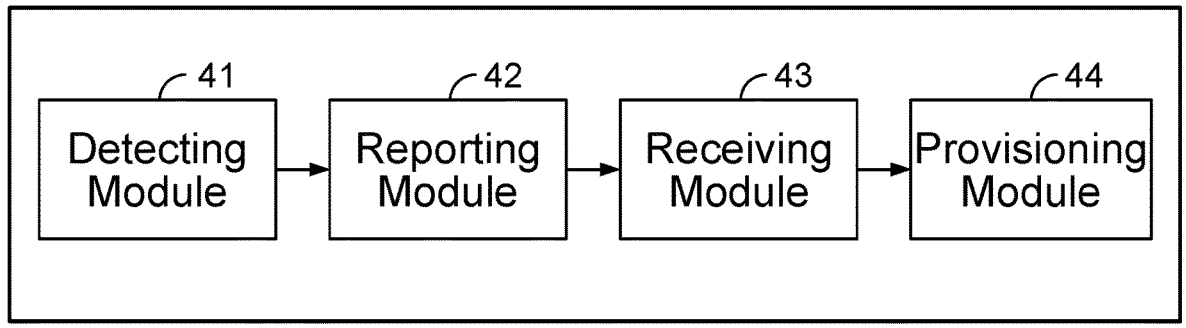
FIG. 4a is a diagram illustrating an embodiment of modules for provisioning from a Bluetooth gateway perspective.

FIG. 4a is a diagram illustrating an embodiment of modules for provisioning from a Bluetooth gateway perspective. In some embodiments, the provisioning modules are implemented as functional modules of Bluetooth gateway 10a in Bluetooth mesh network 10 of FIG. 1. In some embodiments, the provisioning modules are implemented in devices that are independent of, but communicatively connected to, a Bluetooth gateway. The example shown in FIG. 4a includes detecting module 41, reporting module 42, receiving module 43, and provisioning module 44.

The modules can be implemented as software components executing on one or more processors, as hardware such as programmable logic devices, and/or Application Specific Integrated Circuits designed to elements that can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices.

In various embodiments, detecting module 41 detects an unprovisioned Bluetooth device within the signal coverage area of a Bluetooth gateway, reporting module 42 reports detected, unprovisioned Bluetooth device information to a server in a Bluetooth mesh network so that the server can generate and issue provisioning data for the detected, unprovisioned Bluetooth device, receiving module 43 receives the provisioning data issued by the server, and provisioning module 44 performs a provisioning operation directed at the detected, unprovisioned Bluetooth device according to provisioning data that receiving module 43 receives.

In some embodiments, provisioning module 44 forwards provisioning data to the detected, unprovisioned Bluetooth device so that the detected, unprovisioned Bluetooth device can access the Bluetooth mesh network. In some embodiments, detecting module 41 detects an unprovisioned Bluetooth device within the signal coverage area of the Bluetooth gateway in response to a user-issued detection instruction.

Figure 4B:
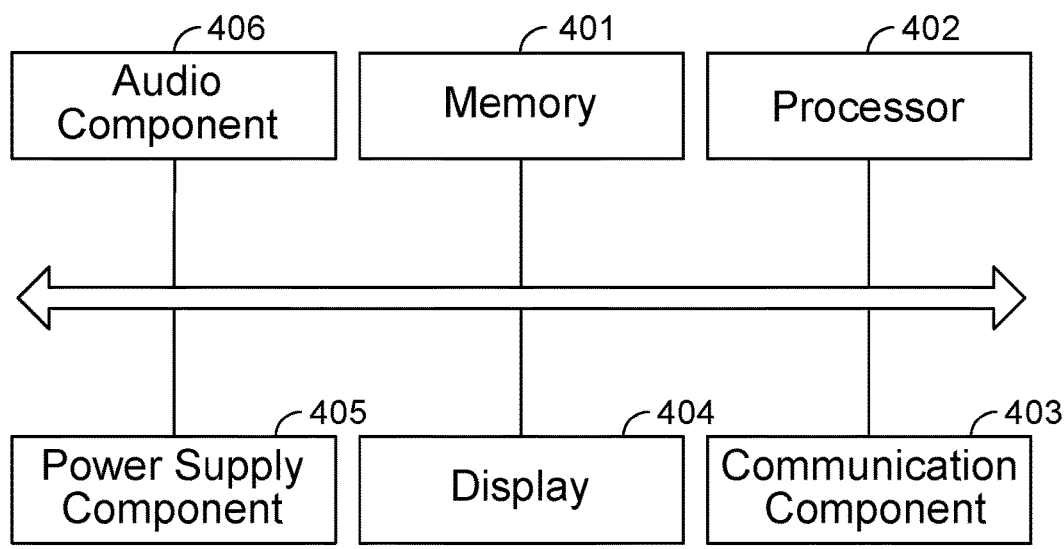
FIG. 4b is a diagram illustrating an embodiment of a Bluetooth gateway.

FIG. 4b is a diagram illustrating an embodiment of a Bluetooth gateway. In some embodiments, the Bluetooth gateway illustrated in FIG. 4b is one of the Bluetooth gateways 10a in Bluetooth mesh network 10 of FIG. 1. In the example shown, the Bluetooth gateway includes memory 401, processor 402, and communication component 403.

In various embodiments, memory 401 stores computer programs and is configured to store other kinds of data to support operations on Bluetooth gateways. Examples of this data include the instructions of any application program or method used in Bluetooth gateway operations, contact data, telephone directory data, messages, pictures, and video.

In various embodiments, processor 402 is coupled to memory 401 and executes computer programs in memory 401, for example, for detecting an unprovisioned Bluetooth device within the signal coverage area of the Bluetooth gateway, reporting detected, unprovisioned Bluetooth device information through communication component 403 to a server in the Bluetooth mesh network so that the server can generate provisioning data for the detected, unprovisioned Bluetooth device, and upon receiving the provisioning data issued by the server through communication component 403, performing a provisioning operation directed at the detected, unprovisioned Bluetooth device using the provisioning data.

In some embodiments, when a provisioning operation directed at the detected, unprovisioned Bluetooth device is performed, processor 402 forwards provisioning data to the detected, unprovisioned Bluetooth device so that the detected, unprovisioned Bluetooth device can access the Bluetooth mesh network. In some embodiments, processor 402 detects an unprovisioned Bluetooth device within the signal coverage area of the Bluetooth gateway in response to a user-issued detection instruction.

The Bluetooth gateway of FIG. 4b also includes display 404, power supply component 405, an audio component 406, and other components that are not shown. FIG. 4b schematically presents only some of the components; other components that are not shown may also be present.

Bluetooth gateways described herein in conjunction with a server constitute a new type of Bluetooth mesh network. By coupling with the server, the Bluetooth gateways can authorize unprovisioned Bluetooth devices to access the Bluetooth mesh network. This facilitates flexible expansion of the Bluetooth mesh network provisioning coverage area and overcomes limitations in existing Bluetooth mesh networks, e.g., constraints on provisioning coverage area. In some embodiments, a computer-readable medium stores computer programs, which when executed, are capable of implementing all the steps executable by the Bluetooth gateway of FIG. 4b.

Figure 5A:
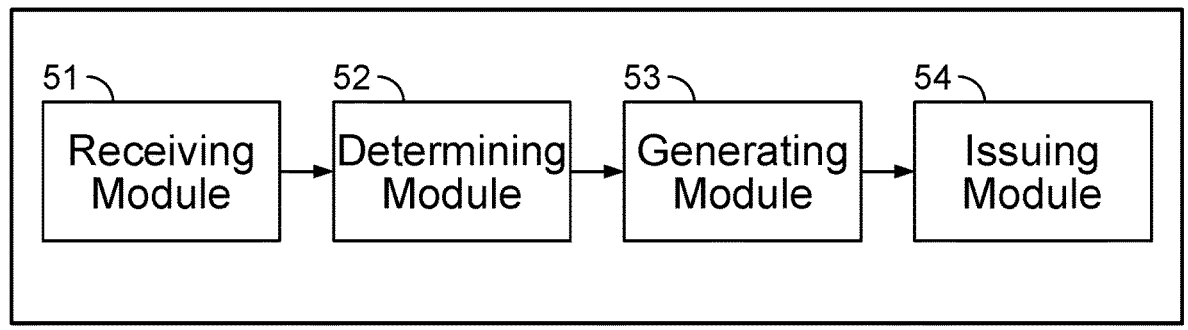
FIG. 5a is a diagram illustrating an embodiment of modules for provisioning from a server perspective.

FIG. 5a is a diagram illustrating an embodiment of modules for provisioning from a server perspective. In some embodiments, the provisioning modules are implemented as functional modules of server 10b in Bluetooth mesh network 10 of FIG. 1. In some embodiments, the provisioning modules are implemented in a device that is independent of, but communicatively connected to, the server. The example shown in FIG. 5a includes receiving module 51, determining module 52, generating module 53, and issuing module 54.

The modules can be implemented as software components executing on one or more processors, as hardware such as programmable logic devices, and/or Application Specific Integrated Circuits designed to elements that can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices.

In various embodiments, receiving module 51 receives destination Bluetooth device information reported by one or more Bluetooth gateways in a Bluetooth mesh network (the destination Bluetooth device being an unprovisioned Bluetooth device detected by one or more Bluetooth gateways), determining module 52 determines a destination Bluetooth gateway from among one or more Bluetooth gateways, generating module 53 generates provisioning data for the destination Bluetooth device, and issuing module 54 issues the provisioning data to the destination Bluetooth gateway so that the destination Bluetooth gateway can perform a provisioning operation directed at the destination Bluetooth device.

In some embodiments, receiving module 51 starts a timer upon receiving destination Bluetooth device information reported by a first Bluetooth gateway and continues to receive destination Bluetooth device information reported by other Bluetooth gateways while the timer is running (the first Bluetooth gateway being the Bluetooth gateway that was the first to report the destination Bluetooth device information). In some embodiments, determining module 52 determines the destination Bluetooth gateway from among the first Bluetooth gateway and the other Bluetooth gateways if destination Bluetooth device information reported by a Bluetooth gateway other than the first Bluetooth gateway is received while the timer is running. In various embodiments, the first Bluetooth gateway is determined to be the destination Bluetooth gateway if no information about the destination Bluetooth device as reported by another Bluetooth gateway is received while the timer is running.

In some embodiments, when determining the destination Bluetooth gateway from among the first Bluetooth gateway and other Bluetooth gateways, determining module 52 uses the signal strengths of the destination Bluetooth device detected by the first Bluetooth gateway and the other Bluetooth gateways as a basis to select the destination Bluetooth gateway (for signal strengths that are sufficiently strong) and/or uses the priority levels of the first Bluetooth gateway and the other Bluetooth gateways as a basis to select the destination Bluetooth gateway (for priority levels that meet a priority level requirement).

In some embodiments, receiving module 51, upon receiving destination Bluetooth device information reported by a first Bluetooth gateway, continues to use subsequently received unprovisioned Bluetooth device information as a basis to identify other Bluetooth gateways that detected the destination Bluetooth device. In some embodiments, determining module 52, upon receiving destination Bluetooth device information reported by a first Bluetooth gateway, directly determines the first Bluetooth gateway to be the destination Bluetooth gateway.

Figure 5B:
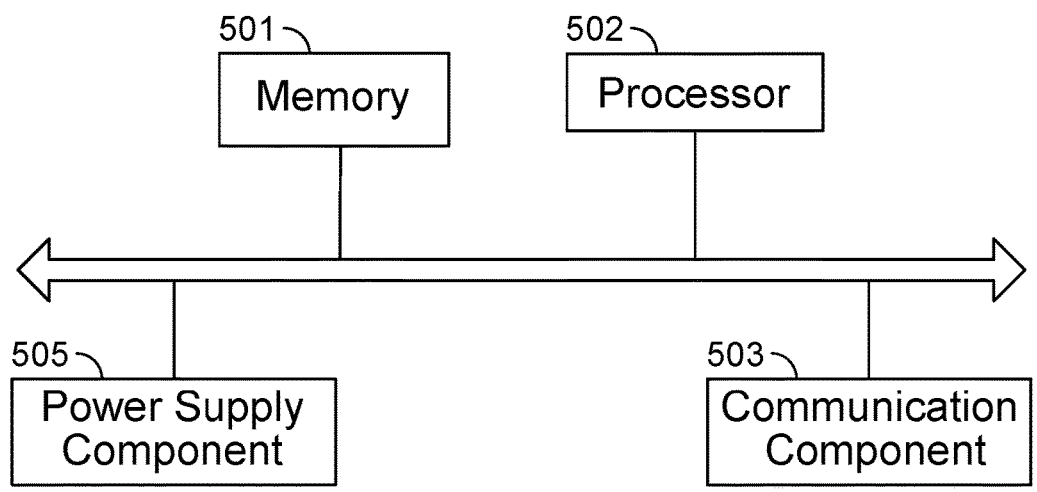
FIG. 5b is a diagram illustrating an embodiment of a server.

FIG. 5b is a diagram illustrating an embodiment of a server. In some embodiments, the server illustrated in FIG. 5b is server 10b in Bluetooth mesh network 10 of FIG. 1. In the example shown, the server includes memory 501, processor 502, and communication component 503.

In various embodiments, communication component 503 receives destination Bluetooth device information reported by one or more Bluetooth gateways in a Bluetooth mesh network. The destination Bluetooth device is an unprovisioned Bluetooth device detected by one or more Bluetooth gateways. In various embodiments, memory 501 stores computer programs and may be configured to store other kinds of data to support operations on the server. Examples of this data include the instructions of any application program or method used in server operations, contact data, telephone directory data, messages, pictures, and video.

In various embodiments, processor 502 is coupled to memory 501, and executes computer programs in memory 501, for example, for determining a destination Bluetooth gateway from the one or more Bluetooth gateways, generating provisioning data for the destination Bluetooth device, and issuing the provisioning data through communication component 503 to the destination Bluetooth gateway so that the destination Bluetooth gateway can perform a provisioning operation directed at the destination Bluetooth device.

In some embodiments, processor 502 starts a timer when communication component 503 receives Bluetooth device information reported by a first Bluetooth gateway and communication component 503 continues to receive destination Bluetooth device information reported by other Bluetooth gateways while the timer is running (wherein the first Bluetooth gateway is the Bluetooth gateway that was the first to report destination Bluetooth device information). In various embodiments, processor 502 determines the destination Bluetooth gateway from among the first Bluetooth gateway and the other Bluetooth gateways if destination Bluetooth device information reported by a Bluetooth gateway other than the first Bluetooth gateway is received through communication component 503 while the timer is running. The first Bluetooth gateway may be determined to be the destination Bluetooth gateway if no information about a destination Bluetooth device reported by another Bluetooth gateway is received through communication component 503 while the timer is running.

In some embodiments, when determining the destination Bluetooth gateway from among the first Bluetooth gateway and other Bluetooth gateways, processor 502 uses the signal strengths of the destination Bluetooth device detected by the first Bluetooth gateway and the other Bluetooth gateways as a basis to select the destination Bluetooth gateway (for signal strengths that are sufficiently strong) and/or uses the priority levels of the first Bluetooth gateway and the other Bluetooth gateways as a basis to select the destination Bluetooth gateway (for priority levels that meet a priority level requirement).

In some embodiments, communication component 503, upon receiving destination Bluetooth device information reported by a first Bluetooth gateway, continues to use subsequently received unprovisioned Bluetooth device information as a basis to identify other Bluetooth gateways that detected the destination Bluetooth device. Processor 502 may directly determine the first Bluetooth gateway to be the destination Bluetooth gateway when communication component 503 receives destination Bluetooth device information reported by a first Bluetooth gateway.

The server of FIG. 5b also includes power supply component 505 and other components that are not shown. FIG. 5b schematically presents only some of the components; other components that are not shown may also be present.

The server described herein in conjunction with a plurality of Bluetooth gateways constitute a new type of Bluetooth mesh network. By coupling with the plurality of Bluetooth gateways, the server can authorize unprovisioned Bluetooth devices to access a Bluetooth mesh network. This facilitates flexible expansion of the Bluetooth mesh network provisioning coverage area and overcomes limitations of existing Bluetooth mesh networks, e.g., constraints on provisioning coverage area. In some embodiments, a computer-readable medium stores computer programs, which when executed, are capable of implementing all the steps executable by the server of FIG. 5b.

The memory in FIGS. 4b and 5b may be any type of volatile or non-volatile storage device or combination thereof, such as static random access memory (SRAM), electrically erasable programmable read-only memory (EEPROM), erasable programmable read-only memory (EPROM), programmable read-only memory (PROM), read-only memory (ROM), magnetic storage, flash memory, magnetic disks, or optical disks.

The communication component in FIGS. 4b and 5b is configured to facilitate wired or wireless communication between the device where the communication component is located and other devices. The device where the communication component is located may access wireless networks based on a communications standard such as WiFi, 2G, 3G, 4G, 5G, or a combination thereof. In some embodiments, the communication component receives via broadcast channels broadcast signals or broadcast-related information from external broadcast management systems. In some embodiments, the communication component includes a near-field communication module (NFC) for promoting short-range communication. For example, short-range communication can be achieved in the NFC module on the basis of radio-frequency identification (RFID) technology, Infrared Data Association (IrDA) technology, ultra-wide band (UWB) technology, Bluetooth (BT) technology, and other technology.

The display in FIG. 4b may include a screen, which may include a liquid crystal display (LCD) and a touch panel (TP). If the screen includes a touch panel, the screen may be implemented as a touchscreen to receive input signals from a user. The touch panel may include one or more touch sensors to detect touch, sliding actions, and gestures on the touch panel. The touch sensor would not only detect the boundaries of touch or slide actions, but also measure the duration and pressure related to the touch or slide operations.

The power supply component in FIGS. 4b and 5b provides electric power to the various components of the device where the power supply component is located. The power supply may include a power supply management system, one or more power supplies, and other components related to generating, managing, and distributing power to the device where the power supply component is located.

The audio component in FIG. 4b may be configured to output and/or receive audio signals. For example, the audio component may include a microphone (MIC). When the device where the audio component is located is in an operating mode, e.g., when in calling mode, recording mode, or speech recognition mode, the microphone is configured to receive external audio signals. The received audio signals may be stored in memory or transmitted by the communication component. In some embodiments, the audio component includes a speaker for outputting audio signals.

Figure 6:
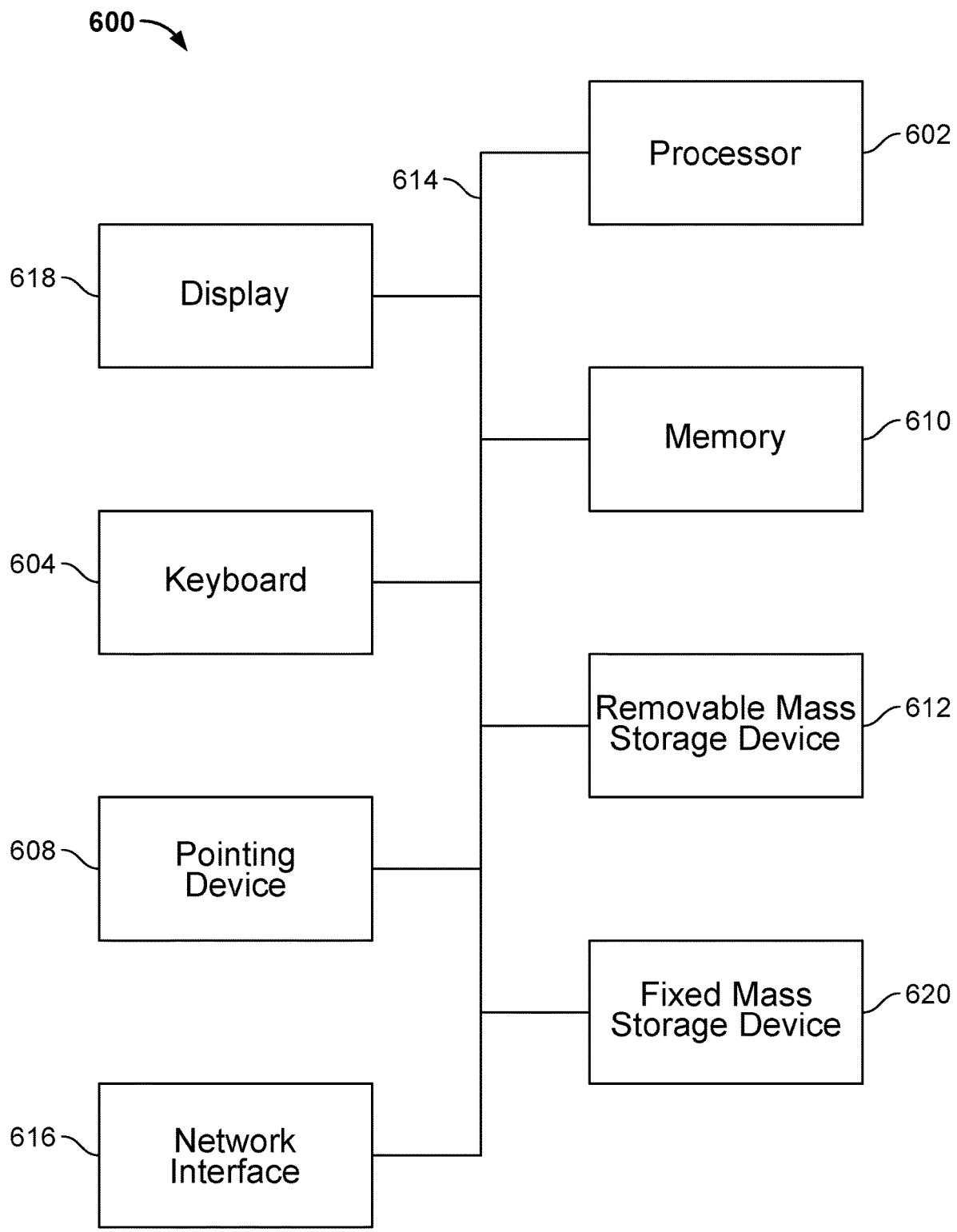
FIG. 6 is a functional diagram illustrating an embodiment of a programmed computer system.

FIG. 6 is a functional diagram illustrating an embodiment of a programmed computer system. In some embodiments, the programmed computer system of FIG. 6 implements one or more Bluetooth gateways 10a and/or server 10b in Bluetooth mesh network 10 of FIG. 1. In some embodiments, the programmed computer system of FIG. 6 implements the process of FIG. 2 and/or the process of FIG. 3a. In some embodiments, the programmed computer system of FIG. 6 implements one or more Bluetooth gateways and/or the server in the Bluetooth mesh network of FIG. 3b. In some embodiments, the programmed computer system of FIG. 6 implements the provisioning sequence of FIG. 3c. In some embodiments, the programmed computer system of FIG. 6 implements the provisioning modules of FIG. 4a and/or FIG. 5a.

As will be apparent, other computer system architectures and configurations can also be used. Computer system 600, which includes various subsystems as described below, includes at least one microprocessor subsystem (also referred to as a processor or a central processing unit (CPU)) 602. For example, processor 602 can be implemented by a single-chip processor or by multiple processors. In some embodiments, processor 602 is a general purpose digital processor that controls the operation of the computer system 600. Using instructions retrieved from memory 610, the processor 602 controls the reception and manipulation of input data, and the output and display of data on output devices (e.g., display 618).

Processor 602 is coupled bi-directionally with memory 610, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 602. Also as is well known in the art, primary storage typically includes basic operating instructions, program code, data, and objects used by the processor 602 to perform its functions (e.g., programmed instructions). For example, memory 610 can include any suitable computer readable storage media, described below, depending on whether, for example, data access needs to be bi-directional or uni-directional. For example, processor 602 can also directly and very rapidly retrieve and store frequently needed data in a cache memory (not shown).

A removable mass storage device 612 provides additional data storage capacity for the computer system 600 and is coupled either bi-directionally (read/write) or uni-directionally (read only) to processor 602. For example, storage 612 can also include computer readable media such as magnetic tape, flash memory, PC-CARDS, portable mass storage devices, holographic storage devices, and other storage devices. A fixed mass storage 620 can also, for example, provide additional data storage capacity. The most common example of fixed mass storage 620 is a hard disk drive. Mass storages 612, 620 generally store additional programming instructions, data, and the like that typically are not in active use by the processor 602. It will be appreciated that the information retained within mass storages 612 and 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display 618, a network interface 616, a keyboard 604, and a pointing device 608, as well as an auxiliary input/output device interface, a sound card, speakers, and other subsystems as needed. For example, the pointing device 608 can be a mouse, stylus, track ball, or tablet, and is useful for interacting with a graphical user interface.

The network interface 616 allows processor 602 to be coupled to another computer, computer network, or telecommunications network using a network connection as shown. For example, through the network interface 616, the processor 602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect the computer system 600 to an external network and transfer data according to standard protocols. For example, various process embodiments disclosed herein can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

An auxiliary I/O device interface (not shown) can be used in conjunction with computer system 600. The auxiliary I/O device interface can include general and customized interfaces that allow the processor 602 to send and, more typically, receive data from other devices such as microphones, touch-sensitive displays, transducer card readers, tape readers, voice or handwriting recognizers, biometrics readers, cameras, portable mass storage devices, and other computers.

In some embodiments, computing equipment comprises one or more processors (CPUs), input/output interfaces, network interfaces, and memory. Memory may include such forms as volatile storage devices in computer-readable media, random access memory (RAM) and/or non-volatile memory, such as read-only memory (ROM) or flash memory (flash RAM). Memory is an example of a computer-readable medium.

Computer-readable media, including permanent and non-permanent media and removable and non-removable media, may achieve information storage by any technique or technology. Information can be computer-readable commands, data structures, program modules, or other data. Examples of computer storage media include but are not limited to phase-change memory (PRAM), static random access memory (SRAM), dynamic random access memory (DRAM), other types of random access memory, read-only memory (ROM), electrically erasable programmable read-only memory (EEPROM), flash memory, or other memory technology, CD-ROM, digital multifunction disc (DVD) or other optical storage, magnetic cassettes, magnetic tape or magnetic disc memory, or other magnetic storage equipment or any other non-transmission media that can be used to store information that is accessible to computers. As defined in this document, computer-readable media does not include transitory computer-readable media, such as modulated data signals and carrier waves.

A person skilled in the art should understand that the embodiments of the present invention can be provided as methods, systems or computer program products. Therefore, the present invention may take the form of complete hardware embodiments, complete software embodiments, or embodiments that combine software and hardware. Moreover, the present invention may take the form of computer program products implemented on one or more computer-operable storage media (including but not limited to magnetic disk storage, CD-ROMs, and optical storage) containing computer-operable program code.

The present invention is described with reference to flow charts and/or block diagrams based on methods, equipment (systems) and computer program products of the present invention. Please note that each process flow and/or block within the flowcharts and/or block diagrams and combinations of process flows and/or blocks within the flowcharts and/or block diagrams can be implemented by computer instructions. These computer program instructions can be provided to general-purpose computers, special-purpose computers, embedded processors, or processors of other data-processing devices to give rise to a machine such that the instructions by the computers or by the processors of other programmable data-processing devices give rise to devices used to implement the functions specified in one or more processes in a flowchart and/or in one or more blocks in a block diagram.

These computer program instructions can also be stored in computer-readable memory that can guide computers or other programmable data-processing devices to operate according to specific modes, with the result that the instructions stored in this computer-readable memory give rise to products that include command means. These command means implement the functions specified in one or more processes in a flow chart and/or one or more blocks in a block diagram.

These computer program instructions can also be loaded onto a computer or other programmable data-processing device, with the result that a series of operating steps are executed on a computer or other programmable device so as to give rise to computer processing. In this way, the instructions executed on a computer or other programmable device provide steps for implementing the functions specified by one or more processes in a flow chart and/or one or more blocks in a block diagram.

In a typical configuration, a computer device comprises one or more processors (CPUs), input/output ports, network interfaces, and memory.

Memory may include the following forms in computer-readable media: volatile memory, random access memory (RAM), and/or non-volatile memory, e.g., read-only memory (ROM) or flash RAM. Memory is an example of a computer-readable medium.

Computer-readable media, including permanent and non-permanent and removable and non-removable media, may achieve information storage by any method or technology. Information may be computer-readable instructions, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digital multifunction disc (DVD) or other optical storage, magnetic cassettes, magnetic tape or magnetic disc storage, or other magnetic storage equipment or any other non-transmission media that can be used to store information that is accessible to computers. In accordance with the definitions in this document, computer-readable media do not include transitory computer-readable media (transitory media) such as modulated data signals and carrier waves.

A Bluetooth mesh network architecture has been disclosed. Provisioning associated with this Bluetooth mesh network architecture has also been disclosed. A practical and technological benefit of the disclosed invention is that limitations on provisioning coverage (as seen in existing Bluetooth mesh networks) are mitigated by using the disclosed invention. The disclosed Bluetooth mesh network architecture includes a plurality of Bluetooth gateways and a server. The plurality of Bluetooth gateways collaborate with the server. In various embodiments, the server is responsible for generating provisioning data for unprovisioned Bluetooth devices detected by the plurality of Bluetooth gateways. In various embodiments, the plurality of Bluetooth gateways is responsible for performing provisioning operations for detected, unprovisioned Bluetooth devices using the provisioning data generated by the server so that the unprovisioned Bluetooth devices can access the Bluetooth mesh network. In various embodiments, a server-Bluetooth gateway collaborative mode is employed, and the Bluetooth mesh network supports a plurality of Bluetooth gateways. A practical and technological benefit of this arrangement is that the area detectable by a plurality of Bluetooth gateways can be extended to a relatively large distance. Furthermore, flexibility is another practical and technological benefit. Bluetooth gateways can be deployed in a quantity commensurate with the required network coverage area, making it possible to flexibly expand Bluetooth mesh network provisioning coverage and thus overcome limitations of existing Mesh networks, e.g., with respect to constraints on provisioning coverage.

Please also note that the term "comprise" or "contain" or any of their variants are to be taken in their non-exclusive sense. Thus, processes, methods, merchandise, or devices that comprise a series of elements comprise not only those elements, but also other elements that have not been explicitly listed or those that are intrinsic to such processes, methods, merchandise, or devices. In the absence of further limitations, elements that are limited by the phrase "comprises a(n) . . . " do not exclude the existence of additional identical elements in the processes, methods, merchandise, or devices that comprise the elements.

The above-stated are merely embodiments of the present application and do not limit the present application. For persons skilled in the art, the present application may have various modifications and variations. Any modification, equivalent substitution, or improvement made in keeping with the spirit and principles of the present application shall be included within the scope of the claims of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor; and
   a memory coupled with the processor, wherein the memory is configured to provide the processor with instructions which when executed cause the processor to:
   receive information reported by one or more gateway nodes in a Bluetooth mesh network regarding an unprovisioned Bluetooth device;
   after receiving information reported by a first gateway node regarding the unprovisioned Bluetooth device, start a timer that is allowed to run for a specified length of time, wherein only the first gateway node and gateway nodes that subsequently report information regarding the unprovisioned Bluetooth device within the specified length of time are eligible to be determined to be a destination Bluetooth gateway node;
   generate provisioning data for the unprovisioned Bluetooth device;
   determine the destination Bluetooth gateway node from among the one or more gateway nodes reporting the received information to which to issue the generated provisioning data; and
   issue the generated provisioning data to the destination Bluetooth gateway node so that the destination Bluetooth gateway node can perform a provisioning operation directed at the unprovisioned Bluetooth device.

2. The system of claim 1, wherein the system includes a server node that is communicatively connected to the one or more gateway nodes in the Bluetooth mesh network.

3. The system of claim 2, wherein the server node is a cloud server, cloud host, or virtual data center server.

4. The system of claim 1, wherein the received information includes a universally unique identifier associated with the unprovisioned Bluetooth device.

5. The system of claim 4, wherein the universally unique identifier is a Bluetooth device product identifier or a media access control address.

6. The system of claim 1, wherein the Bluetooth mesh network comprises at least two gateway nodes whose signal coverage areas at least partially overlap.

7. The system of claim 1, wherein the unprovisioned Bluetooth device was detected by the one or more gateway nodes after the one or more gateway nodes received one or more detection instructions from a user.

8. The system of claim 1, wherein the generated provisioning data includes a key that defines membership in the Bluetooth mesh network and possession of which grants access to the Bluetooth mesh network.

9. The system of claim 1, wherein the Bluetooth mesh network comprises at least two gateway nodes and the destination Bluetooth gateway node is determined based at least in part on signal strengths of the unprovisioned Bluetooth device detected by the at least two gateway nodes.

10. The system of claim 1, wherein the Bluetooth mesh network comprises at least two gateway nodes and the destination Bluetooth gateway node is determined based at least in part on priority levels of the at least two gateway nodes.

11. The system of claim 1, wherein the destination Bluetooth gateway node is determined to be whichever gateway node first detects the unprovisioned Bluetooth device.

12. The system of claim 1, wherein at least one of the one or more gateway nodes is a programmed computer system.

13. The system of claim 1, wherein the Bluetooth mesh network includes at least the first gateway node, a first group of one or more Bluetooth devices detectable by the first gateway node, a second gateway node, and a second group of one or more Bluetooth devices detectable by the second gateway node.

14. The system of claim 13, wherein at least one device in the first group of one or more Bluetooth devices also belongs to the second group of one or more Bluetooth devices.

15. The system of claim 1, wherein the provisioning operation includes delivering a key that grants access to the Bluetooth mesh network to the unprovisioned Bluetooth device.

16. The system of claim 1, wherein the one or more gateway nodes and the unprovisioned Bluetooth device are located in a residential environment.

17. A method, comprising:
  receiving information reported by one or more gateway nodes in a Bluetooth mesh network regarding an unprovisioned Bluetooth device;
  after receiving information reported by a first gateway node regarding the unprovisioned Bluetooth device, starting a timer that is allowed to run for a specified length of time, wherein only the first gateway node and gateway nodes that subsequently report information regarding the unprovisioned Bluetooth device within the specified length of time are eligible to be determined to be a destination Bluetooth gateway node;
  generating provisioning data for the unprovisioned Bluetooth device;
  determining the destination Bluetooth gateway node from among the one or more gateway nodes reporting the received information to which to issue the generated provisioning data; and
  issuing the generated provisioning data to the destination Bluetooth gateway node so that the destination Bluetooth gateway node can perform a provisioning operation directed at the unprovisioned Bluetooth device.

18. A computer program product, the computer program product being embodied in a non-transitory computer readable storage medium and comprising computer instructions for:
  receiving information reported by one or more gateway nodes in a Bluetooth mesh network regarding an unprovisioned Bluetooth device;
  after receiving information reported by a first gateway node regarding the unprovisioned Bluetooth device, starting a timer that is allowed to run for a specified length of time, wherein only the first gateway node and gateway nodes that subsequently report information regarding the unprovisioned Bluetooth device within the specified length of time are eligible to be determined to be a destination Bluetooth gateway node;
  generating provisioning data for the unprovisioned Bluetooth device;
  determining the destination Bluetooth gateway node from among the one or more gateway nodes reporting the received information to which to issue the generated provisioning data; and
  issuing the generated provisioning data to the destination Bluetooth gateway node so that the destination Bluetooth gateway node can perform a provisioning operation directed at the unprovisioned Bluetooth device.

* * * * *

UNITED STATES PATENT AND TRADEMARK OFFICE
CERTIFICATE OF CORRECTION

PATENT NO. : 10,951,470 B2
APPLICATION NO. : 16/407013
DATED : March 16, 2021
INVENTOR(S) : Junfeng Hu Page 1 of 1

It is certified that error appears in the above-identified patent and that said Letters Patent is hereby corrected as shown below:

On the Title Page

Item (73), assignee, address, insert --Cayman Islands (KY)--.

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*